(12) United States Patent
Wang et al.

(10) Patent No.: US 8,994,867 B2
(45) Date of Patent: Mar. 31, 2015

(54) IMAGE SENSOR, OPERATING METHOD THEREOF, AND DEVICE INCLUDING THE IMAGE SENSOR

(71) Applicants: Yibing Wang, Pasadena, CA (US); Eric Fossum, Wolfeboro, NH (US); Ilia Ovsiannikov, Studio City, CA (US); Yoon Dong Park, Osan-Si (KR); Dong Ki Min, Seoul (KR)

(72) Inventors: Yibing Wang, Pasadena, CA (US); Eric Fossum, Wolfeboro, NH (US); Ilia Ovsiannikov, Studio City, CA (US); Yoon Dong Park, Osan-Si (KR); Dong Ki Min, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 42 days.

(21) Appl. No.: 13/832,289

(22) Filed: Mar. 15, 2013

(65) Prior Publication Data

US 2014/0267859 A1    Sep. 18, 2014

(51) Int. Cl.
| | | |
|---|---|---|
| *H04N 3/14* | (2006.01) | |
| *H04N 5/335* | (2011.01) | |
| *H04N 5/217* | (2011.01) | |
| *H04N 5/359* | (2011.01) | |
| *H04N 5/372* | (2011.01) | |

(52) U.S. Cl.
CPC .............. *H04N 5/359* (2013.01); *H04N 5/372* (2013.01)
USPC .......................................... 348/308; 348/241

(58) Field of Classification Search
None
See application file for complete search history.

(56) References Cited

U.S. PATENT DOCUMENTS

| | | | |
|---|---|---|---|
| 5,705,807 A | 1/1998 | Throngnumchai et al. | |
| 6,348,681 B1 * | 2/2002 | Kindt et al. | 348/301 |
| 6,924,887 B2 | 8/2005 | Dosluoglu et al. | |
| 7,034,274 B2 | 4/2006 | Hashimoto et al. | |
| 7,075,130 B2 * | 7/2006 | Delbruck et al. | 257/233 |
| 7,248,344 B2 | 7/2007 | Morcom | |
| 7,436,496 B2 | 10/2008 | Kawahito | |
| 7,623,221 B2 | 11/2009 | Thun et al. | |
| 8,159,598 B2 | 4/2012 | Watanabe et al. | |
| 8,203,699 B2 | 6/2012 | Bamji et al. | |
| 2002/0176067 A1 * | 11/2002 | Charbon | 356/4.01 |
| 2008/0048100 A1 * | 2/2008 | Bamji et al. | 250/214 A |
| 2008/0079833 A1 * | 4/2008 | Ichikawa et al. | 348/311 |
| 2009/0002533 A1 * | 1/2009 | Chen et al. | 348/301 |
| 2009/0190007 A1 * | 7/2009 | Oggier et al. | 348/241 |
| 2010/0013976 A1 * | 1/2010 | Sakakibara et al. | 348/311 |
| 2010/0118772 A1 | 5/2010 | Cheng et al. | |
| 2010/0277622 A1 | 11/2010 | Fossum et al. | |
| 2010/0290674 A1 | 11/2010 | Kim | |
| 2012/0059625 A1 * | 3/2012 | Kim et al. | 702/159 |
| 2012/0062705 A1 | 3/2012 | Ovsiannikov et al. | |
| 2012/0154573 A1 | 6/2012 | Cohen | |

\* cited by examiner

*Primary Examiner* — Jason Flohre
(74) *Attorney, Agent, or Firm* — Volentine & Whitt, PLLC

(57) ABSTRACT

An image sensor includes a first photoelectric conversion element supplying charges to a first charge storage node, a first charge storage element adjusting an amount of charges supplied from a charge supply source to the first charge storage node in response to a feedback signal, and a feedback signal generating circuit generating the feedback signal based on an amount of charges in the first charge storage node.

24 Claims, 32 Drawing Sheets

IMAGE SENSOR, OPERATING METHOD THEREOF, AND DEVICE INCLUDING THE IMAGE SENSOR

BACKGROUND

Embodiments of the present inventive concept relate to image sensing technology, and more particularly, embodiments of the present inventive concept relate to image sensors, methods of operating image sensors, and devices including the image sensors.

A CMOS image sensor is a solid-state image sensing device which is fabricated using a complementary metal-oxide semiconductor (CMOS) technology. As such, when compared to other types of images sensors such as charge coupled device (CCD) image sensors, a CMOS image sensor can be manufactured at relatively low cost. In addition, the CMOS image sensor exhibits relatively low power consumption when compared to CCD image sensors.

These advantages, coupled with improved performance, have led to the CMOS image sensor being widely adopted in a variety of electric home appliances as well as portable devices such as smart phones and digital cameras.

One technical challenge presented by CMOS image sensors relates to ambient light. That is, ambient light can add noise to image data obtained by the CMOS image sensor, and when a different amount of ambient light is incident on pixels included in the CMOS image sensor, the image data may be distorted.

SUMMARY

An embodiment of the present invention is directed to an image sensor, including a first photoelectric conversion element configured to supply charges to a first charge storage node, a first charge storage element configured to adjust an amount of charges supplied from a charge supply source to the first charge storage node in response to a feedback signal, and a feedback signal generating circuit configured to generate the feedback signal based on the amount of charges in the first charge storage node.

According to an example embodiment, the image sensor further includes a first switch connected to the charge supply source and a second switch connected to the first charge storage node. The first charge storage element is connected between the first switch and the second switch, and the first switch and the second switch may be sequentially turned-on in a non-overlapped section.

According to an example embodiment, the image sensor further includes a second photoelectric conversion element configured to supply charges to a second charge storage node, and a second charge storage element configured to adjust an amount of charges supplied from the charge supply source to the second charge storage node in response to the feedback signal. The feedback signal generating circuit may generate the feedback signal based on the amount of charges in the first charge storage node and an amount of charges in the second charge storage node.

According to an example embodiment, the feedback signal generating circuit may include a comparator, which compares a first pixel signal related to the amount of charges in the first charge storage node with a second pixel signal related to the amount of charges in the second charge storage node and generates a comparison signal according to a result of the comparison, a first selection circuit configured to output the first pixel signal or the second pixel signal based on the comparison signal, and a second selection circuit configured to output a default voltage signal or an output signal of the first selection circuit as the feedback signal based on a charge supply control signal.

According to an example embodiment, the charges generated by the first photoelectric conversion element may be supplied to the first charge storage node in response to a clock signal, and the charges generated by the second photoelectric conversion element may be supplied to the second charge storage node in response to a complementary clock signal. According to an example embodiment, the first charge storage element and the second charge storage element may be a MOS capacitor, respectively.

According to an example embodiment, the feedback signal generating circuit may further include a comparator, which compares a reference signal with a first pixel signal related to the amount of charges in the first charge storage node and generates a comparison signal according to a result of the comparison, and a selection circuit, which outputs a default voltage signal or a charge supply control signal as the feedback signal based on the comparison signal. According to an example embodiment, a counter configured to count a transition frequency of a level of the comparison signal and a memory configured to store a count value of the counter may be further included.

According to an example embodiment, the image sensor may further include a second photoelectric conversion element configured to supply charges to a second charge storage node, and a second charge storage element configured to adjust an amount of charges supplied from the charge supply source to the second charge storage node in response to the feedback signal. The feedback signal generating circuit may further include a first comparator, which compares a reference signal with a first pixel signal related to the amount of charges in the first charge storage node and generates a first comparison signal according to a result of the comparison, a second comparator, which compares the reference signal with a second pixel signal related to the amount of charges in the second charge storage node and generates a second comparison signal, and a selection circuit configured to output a default voltage signal or a charge supply control signal as the feedback signal based on the first comparison signal and the second comparison signal.

According to an example embodiment, the charges generated by the first photoelectric conversion element may be supplied to the first charge storage node in response to a clock signal, and the charges generated by the second photoelectric conversion element may be supplied to the second charge storage node in response to a complementary clock signal. According to an example embodiment, the second photoelectric conversion element configured to supply charges to the second charge storage node may be further included, and the first charge storage element may adjust an amount of charges supplied from the charge supply source to the first charge storage node or an amount of charges supplied from the charge supply source to the second charge storage node in response to the feedback signal.

According to an example embodiment, a first switch configured to control supplying of charges from the charge supply source to the first charge storage element, a second switch switching supplying of charges, stored in the first charge storage element, to the first charge storage node, and a third switch configured to control supplying of charges, stored in the second charge storage element, to the first charge storage node may be further included. According to an example embodiment, the second switch and the third switch may be turned on at a different timing, respectively.

According to an example embodiment, the first switch and the second switch may be turned on together when a reset operation for resetting the first charge storage node is operated.

According to an example embodiment, a second photoelectric conversion element configured to supply charges to a second charge storage node, and a second charge storage element configured to adjust an amount of charges supplied from the charge supply source to the second charge storage node may be further included. The first photoelectric conversion element and the second photoelectric conversion element are disposed in different rows, respectively. The feedback signal generating circuit may transmit the feedback signal, generated based on an amount of charges in the first charge storage node, to the first charge storage node, or transmits the feedback signal, generated based on an amount of charges in the second charge storage node, to the second charge storage node.

According to an example embodiment, the first charge storage element SMCAP may adjust an amount of charges supplied from the charge supply source to the first charge storage node or an amount of charges supplied from the charge supply source to the second charge storage node in response to the feedback signal.

An example embodiment of the present inventive concepts is directed to a method for operating an image sensor, including supplying charges to a first charge storage node, adjusting an amount of charges supplied from a charge supply source to a first charge storage node through the first charge storage element operating in response to a feedback signal, and controlling generation of the feedback signal based on an amount of charges in the first charge storage node.

According to an example embodiment, the method further includes supplying charges to a second charge storage node, and adjusting an amount of charges supplied from the charge supply source to the second charge storage node through a second charge storage element operating in response to the feedback signal. In the controlling generation of a feedback signal, the controlling generation of a feedback signal based on an amount of charges in the first charge storage node and an amount of charges in the second charge storage node may be further included.

According to an example embodiment, the supplying charges to the first charge storage node and the supplying charges to the second charge storage node may be alternately performed using complementary clock signals. According to an example embodiment, in the controlling generation of a feedback signal, one of a first pixel signal related to the amount of charges in the first charge storage node, a second pixel signal related to the amount of charges in the second charge storage node, and a default voltage signal may be output as the feedback signal based on a charge supply control signal.

According to an example embodiment, in the controlling generation of a feedback signal, one of a default voltage signal and a charge supply control signal may be output as the feedback signal based on the first pixel signal related to the amount of charges in the first charge storage node.

An example embodiment of the present inventive concepts is directed to a portable electronic device, including an image sensor, a processor for controlling the image sensor, and a display for displaying an image corresponding to an output signal output from the image sensor. The image sensor may include a photoelectric conversion element configured to supply charges to a first charge storage node, a charge storage element configured to adjust an amount of charges supplied from a charge supply source to the charge storage node, and a feedback signal generating circuit configured to generate the feedback signal based on an amount of charges in the charge storage node. According to an example embodiment, the image sensor may operate in a time of flight (TOF) mode.

An example embodiment of the present inventive concepts is directed to an image processing system, including an image sensor and an image signal processor(ISP) processing image data output from the image sensor. The image sensor may include a first photoelectric conversion element configured to supply charges to a first charge storage node, a first charge storage element configured to adjust an amount of charges supplied from a charge supply source to the first charge storage node in response to a feedback signal, and a feedback signal generating circuit configured to generate the feedback signal based on an amount of charges in the first charge storage node. According to an example embodiment, the image sensor may operate in a time of flight (TOF) mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
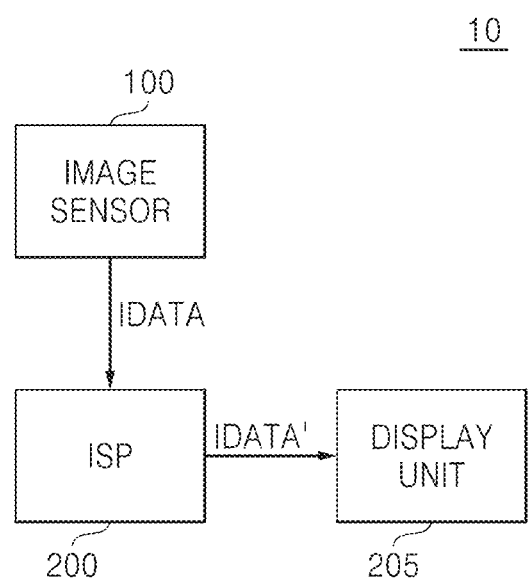
FIG. 1 is a block diagram of an image processing system according to an example embodiment of the present inventive concepts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image processing system according to an example embodiment of the present inventive concepts. Referring to FIG. 1, an image processing system 10 may include an image sensor 100, an image signal processor (ISP) 200, and a display unit 205.

According to an example embodiment, the image sensor 100 and the ISP 200 may be embodied in a system on chip. According to another example embodiment, the image sensor 100 and the ISP 200 may be packaged in a form of multi-chip package. According to still another example embodiment, the image sensor 100 may be embodied in a separate chip from the ISP 200. For example, the image sensor 100 may be embodied in a CMOS image sensor chip.

The image sensor 100 may output image data IDATA corresponding to an image of an object. According to an example embodiment, the image sensor 100 may perform a function of a depth sensor which may obtain and process depth information (or a depth image) of an object. In this case, the image sensor 100 may operate in a time-of-flight (TOF) mode.

The ISP 200 may receive an image data IDATA, process the received image data IDATA, and generate the processed image data IDATA'. According to an example embodiment, the ISP 200 may process the image data IDATA by frame. According to an example embodiment, the ISP 200 may correct light and shade, contrast, and/or chroma of the image data IDATA through a processing step of processing the image data IDATA.

The ISP 200 may transmit the processed image data IDATA' to the display unit 205. The display unit 205 may denote all types of devices which may display the processed image data IDATA'. According to an example embodiment, the display unit 205 may be embodied in a Liquid Crystal Display (LCD), a Light Emitting Diodes (LED) display, an Organic LED (OLED) display, an Active Matrix OLED (AMOLED) display, or a flexible display.

Figure 2:
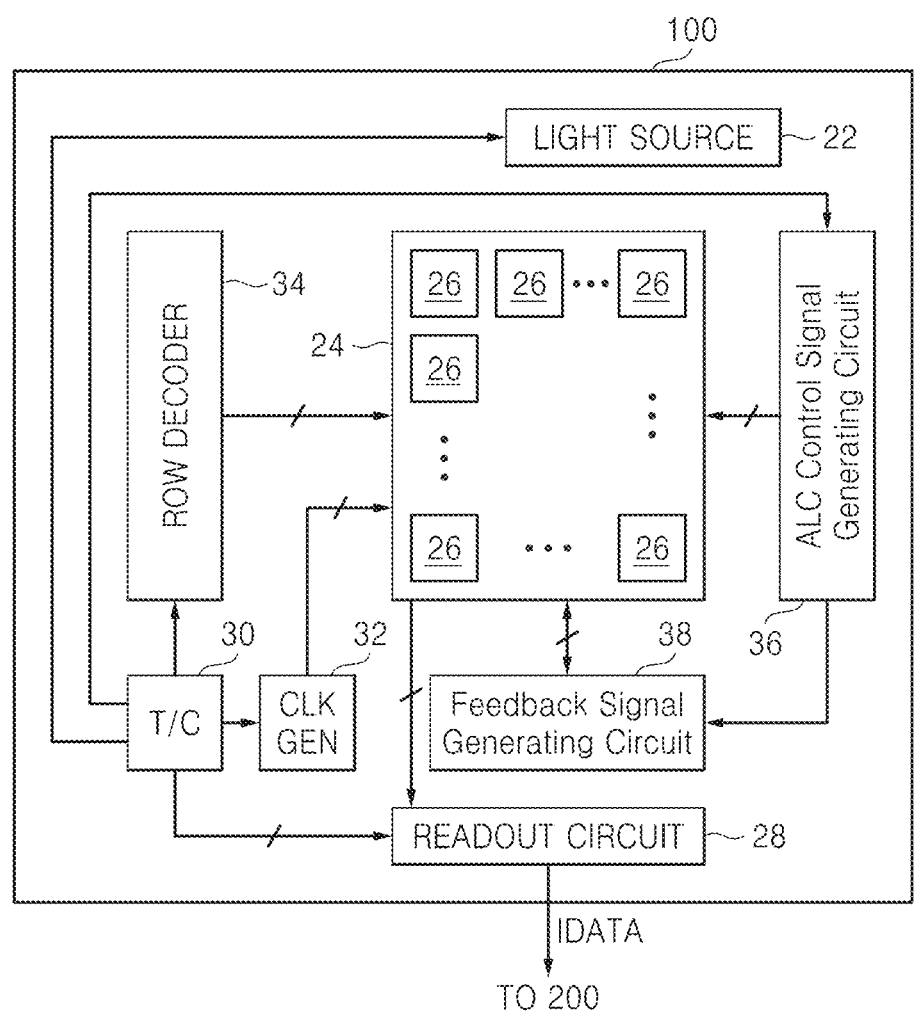
FIG. 2 is a block diagram according to an example embodiment of an image sensor illustrated in FIG. 1.

FIG. 2 is a block diagram according to an example embodiment of the image sensor illustrated in FIG. 1. Referring to FIGS. 1 and 2, the image sensor 100 may include a light source 22, a pixel array 24, a readout circuit 28, a timing controller 30, a clock generator 32, a row decoder 34, an ambient light cancellation (ALC) control signal generating circuit 36, and a feedback signal generating circuit 38.

According to an example embodiment, the image sensor 100 may operate in a rolling shutter mode or a freeze frame shutter mode.

The light source 22 may include a light source driver (not shown) for driving the light source 22. According to an example embodiment, the light source 22 may output a modified light signal, e.g., infrared light, to an object. According to an example embodiment, the image sensor 100 may further include an infrared light pass filter (not shown) for passing through a light signal only, which is output from the light source 22 and reflected by an object.

The pixel array 24 may include a plurality of unit pixels 26. A structure and an operation of each of the plurality of unit pixels 26 will be explained in detail referring to FIGS. 3 to 20. According to an example embodiment, each of the plurality of unit pixels 26 may be embodied in a TOF sensor pixel.

The readout circuit 28 may generate an image data IDATA based on pixel signals output from the pixel array 24.

The timing controller 30 may control each of components of the image sensor, e.g., the light source 22, the readout circuit 28, the clock generator 32, the row decoder 34, the ALC control signal generating circuit 36, and/or the feedback signal generating circuit 38.

The clock generator 32 may generate clock signals according to a control of the timing controller 30, and transmit the generated clock signals to the pixel array 24. According to an example embodiment, when each of the plurality of unit pixels 26 includes a photo gate, the clock generator 32 may transmit clock signals, which may gate the photo gate, to the pixel array 24.

The row decoder 34 may decode a plurality of row control signals, e.g., row address signals, output from the timing controller 30, and drive a specific row line included in the pixel array 24 according to a result of the decoding. The row decoder 34 may denote a concept including a row driver for driving a row line.

The ALC control signal generating circuit 36 may generate a plurality of ALC control signals for controlling an ambient light cancellation (ALC) operation, and supply the plurality of generated ALC control signals to the pixel array 24 and/or the feedback signal generating circuit 38. The feedback signal generating circuit 38 may generate a feedback signal for controlling an ALC operation based on pixel signals output from the pixel array 24, and supply the generated feedback signal to each of the unit pixels 26 included in the pixel array 24.

Figure 3:
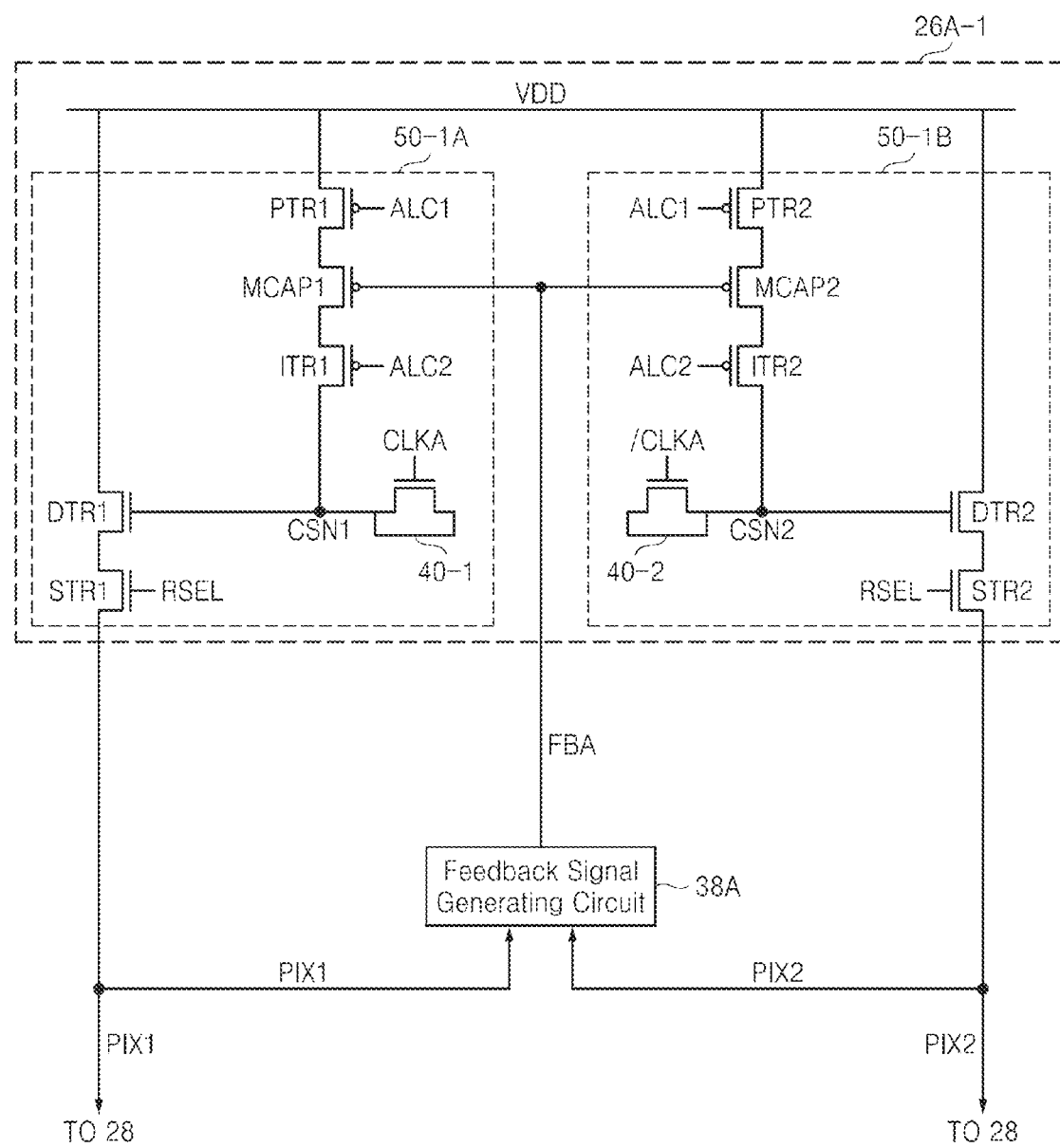
FIG. 3 is a circuit diagram according to an example embodiment of a unit pixel and a feedback signal generating circuit illustrated in FIG. 2.

FIG. 3 is a circuit diagram according to an example embodiment of the unit pixel and the feedback signal generating circuit illustrated in FIG. 2. Referring to FIGS. 2 and 3, a unit pixel 26A-1 according to an example embodiment of the unit pixel 26 illustrated in FIG. 2 may include a first sub pixel 50-1A and a second sub pixel 50-1B. That is, the unit pixel 26A-1 may have a two-tap structure.

The first sub pixel 50-1A may include a first photoelectric conversion element 40-1, a plurality of switches PTR1, ITR1, DTR1, and STR1, and a first charge storage element MCAP1. The plurality of switches PTR1, ITR1, DTR1, and STR1 may be embodied in a metal oxide silicon field effect transistor (MOSFET), respectively.

A transistor PTR1 may supply charges, e.g., holes, from a charge supply source, e.g., a power line VDD, to a first charge storage element MCAP1 in response to a first ALC control signal ALC1.

The first charge storage element MCAP1 may store charges, e.g., holes, supplied through the transistor PTR1 from the power line VDD. According to an example embodiment, the first charge storage element MCAP1 may be embodied in a MOS capacitor. In this case, capacitance of the first charge storage element MCAP1 may change according to a level of a feedback signal FBA. That is, an amount of charges supplied to a first charge storage node CSN1 may be controlled by controlling a level of the feedback signal FBA.

A transistor ITR1 may supply charges, e.g., holes, stored in the first charge storage element MCAP1 to the first charge storage node CSN1 in response to a second ALC control signal ALC2.

The first photoelectric conversion element 40-1 transmits photo charges generated by the first photoelectric conversion element 40-1 to the first charge storage node CSN1 in response to a clock signal CLKA. The first photoelectric conversion element 40-1 may be embodied in a photo transistor, a photo gate, or a pinned photo diode (PPD). A level of the clock signal CLKA is in a complementary relation with a level of a complementary clock signal /CLKA.

A charge storage node, e.g., the first charge storage node CSN1, denotes a node which may store charges generated by a photoelectric conversion element, e.g., the first photoelectric conversion element 40-1. The charge storage node, e.g., the first charge storage node CSN1, may be the same as or different from a floating diffusion node.

A transistor DTR1 performs a function of a source follower buffer amplifier operating in response to a voltage corresponding to charges stored in the first charge storage node CSN1. A transistor STR1 may transmit a first pixel signal PIX1 corresponding to charges generated by the first photoelectric conversion element 40-1 to each of a readout circuit 28 and a feedback signal generating circuit 38A, in response to selection signal RSEL.

The second sub pixel 50-1B may include a second photoelectric conversion element 40-2, a plurality of switches PTR2, ITR2, DTR2 and STR2, and a second charge storage element MCAP2. The plurality of switches PTR2, ITR2, DTR2, and STR2 may be embodied in a metal oxide silicon field effect transistor (MOSFET), respectively.

The second sub pixel 50-1B may output a second pixel signal PIX2 corresponding to charges generated by the second photoelectric conversion element 40-2. A detailed structure and an operation of the second sub pixel 50-1B are substantially the same as a structure and an operation of the first sub pixel 50-1A, so that explanation for this is omitted.

The feedback signal generating circuit 38A may generate a feedback signal FBA based on the first pixel signal PIX1 and the second pixel signal PIX2. That is, the feedback signal generating circuit 38A may generate the feedback signal FBA based on an amount of charges in the first charge storage node CSN1 and an amount of charges in the second charge storage node CSN2. The feedback signal generating circuit 38A will be explained in detail referring to FIG. 4. The first ALC control signal ALC1 and the second ALC control signal ALC2, which are generated by an ALC control signal generating circuit (36 of FIG. 2), are transmitted to the unit pixel 26A-1.

Figure 4:
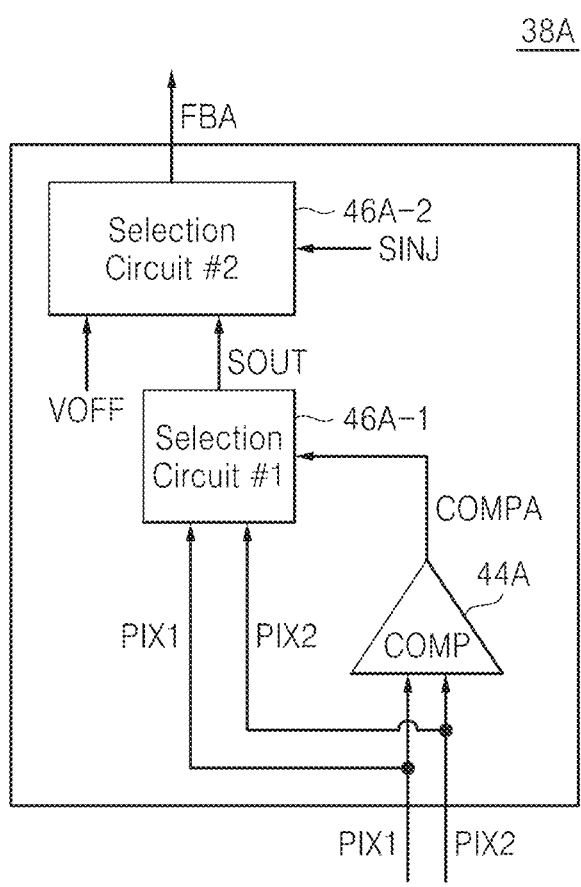
FIG. 4 is a block diagram according to an example embodiment of the feedback signal generating circuit illustrated in FIG. 3.

FIG. 4 is a block diagram according to an example embodiment of the feedback signal generating circuit illustrated in FIG. 3. Referring to FIGS. 3 and 4, the feedback signal generating circuit 38A may include a comparator 44, a first selection circuit 46A-1, and a second selection circuit 46A-2.

The comparator 44A compares the first pixel signal PIX1 with the second pixel signal PIX2, and transmits a comparison signal COMPA to the first selection circuit 46A-1 according to a result of the comparison.

The first selection circuit 46A-1 selects one of the first pixel signal PIX1 and the second pixel signal PIX2 based on the comparison signal COMPA transmitted from the comparator 44A, and outputs the selected signal as an output signal SOUT. The second selection circuit 46A-2 selects one of a default voltage signal VOFF and the output signal SOUT based on a charge supply control signal SINJ, and outputs the selected signal as the feedback signal FBA.

The charge supply control signal SINJ may denote a signal for controlling an operation of storing charges, e.g., holes, each charge storage element, e.g., MCAP1 or MCAP2, or an operation of supplying charges, e.g., holes, stored in the each charge storage elements, e.g., MCAP1 or MCAP2, to each charge storage node, e.g., CSN1 or CSN2.

The default voltage signal VOFF may denote a signal having a voltage level supplied by default when charges, e.g., holes, are not stored in each of the charge storage elements, e.g., MCAP1 and MCAP2. The charge supply control signal SINJ generated by the ALC control signal generating circuit (36 of FIG. 2) is transmitted to the unit pixel 26A-1.

Figure 5:
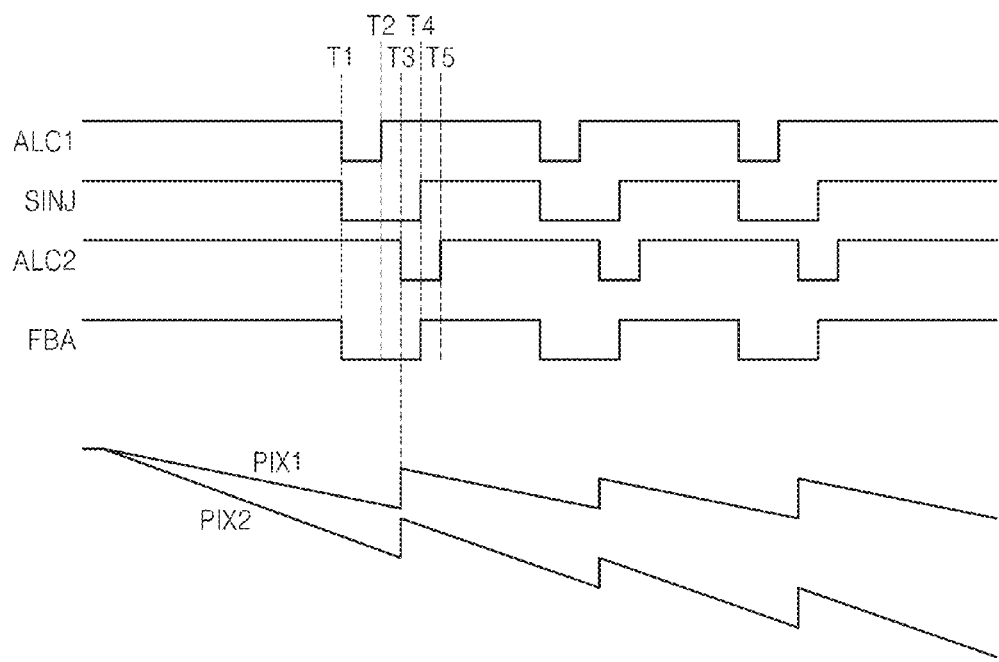
FIG. 5 is a timing diagram according to an example embodiment of signals illustrated in FIGS. 3 and 4.

FIG. 5 is a timing diagram according to an example embodiment of signals illustrated in FIGS. 3 and 4. Referring to FIGS. 3 to 5, a feedback signal FBA may transit at the same timing as the charge supply control signal SINJ as one of a default voltage signal VOFF and an output signal SOUT which is selected by the second selection circuit 46A-2 based on the charge supply control signal SINJ.

At a first point of time T1, the first ALC control signal ALC1 may transit to a level, e.g., a low level or '0', for turning on switches PTR1 and PTR2. Here, the feedback signal FBA may transit to a level, e.g., a low level or '0', for storing charges, e.g., holes, in the charge storage element MCAP1 or MCAP2 together with the first ALC control signal ALC1.

As the first ALC control signal ALC1 transits to a low level or '0' at a first point of time T1, a transistor PTR1 or PTR2 may supply charges, e.g., holes, from a charge supply source, e.g., a power line VDD, to the charge storage element MCAP1 or MCAP2 in response to the first ALC control signal ALC1. As the feedback signal FBA transits to a low level, e.g., '0', at a first point of time T1, the charge storage element MCAP1 or MCAP2 may store charges, e.g., holes, supplied through the transistor PTR1 or PTR2 from the power line VDD in response to the feedback signal FBA.

At a second point of time T2, the first ALC control signal ALC1 may transit to a level, e.g., a high level or '1', for turning off switches PTR1 and PTR2.

At a third point of time T3, the second ALC control signal ALC2 may transit to a level, e.g., a low level or '0', for turning on switches ITR1 and ITR2. As the second ALC control signal ALC2 transits to a low level or '0' at the third point of time T3, the transistor ITR1 or ITR2 may supply charges, e.g., holes, stored in the charges storage element MCAP1 or MCAP2 to the charge storage node CSN1 or CSN2 in response to the second ALC control signal ALC2. As the charges, e.g., holes, are supplied to the charge storage node CSN1 or CSN2, charges, e.g., photo charges, generated by a photoelectric conversion element 40-1 or 40-2 are cancelled out, and a level of the pixel signal PIX1 or PIX2 may be increased. Accordingly, saturation of a sub pixel 50-1A or 50-1B by ambient light may be prevented.

At a fourth point of time T4, the feedback signal FBA may transit to a level, e.g., a high level or '1', for completely releasing charges, e.g., holes, stored in the charge storage element MCAP1 or MCAP2 together with the charge supply control signal SINJ. At a fifth point of time T5, the second ALC control signal ALC2 may transit to a level, e.g., a high level or '1' for turning off switches ITR1 and ITR2.

Figure 6:
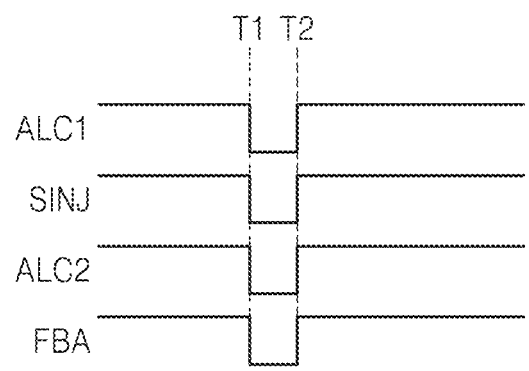
FIG. 6 is a timing diagram according to another example embodiment of the signals illustrated in FIGS. 3 and 4.

FIG. 6 is a timing diagram according to another example embodiment of signals illustrated in FIGS. 3 and 4. Referring to FIGS. 3, 4 and 6, the first ALC control signal ALC1, the charge supply control signal SINJ, the second ALC control signal ALC2, and the feedback signal FBA may transit to a low level or '0' all together at the first point of time T1.

The charge storage node CSN1 or CSN2 may be reset at a first point of time T1. That is each of the sub pixels 50-1A and 50-1B may not include an additional transistor for a reset operation. The first ALC control signal ALC1, the charge supply control signal SINJ, the second ALC control signal ALC2, and the feedback signal FBA may transit to a level, e.g., a high level or '1', before the reset operation to finish a reset operation at a second point of time T2.

Figure 7:
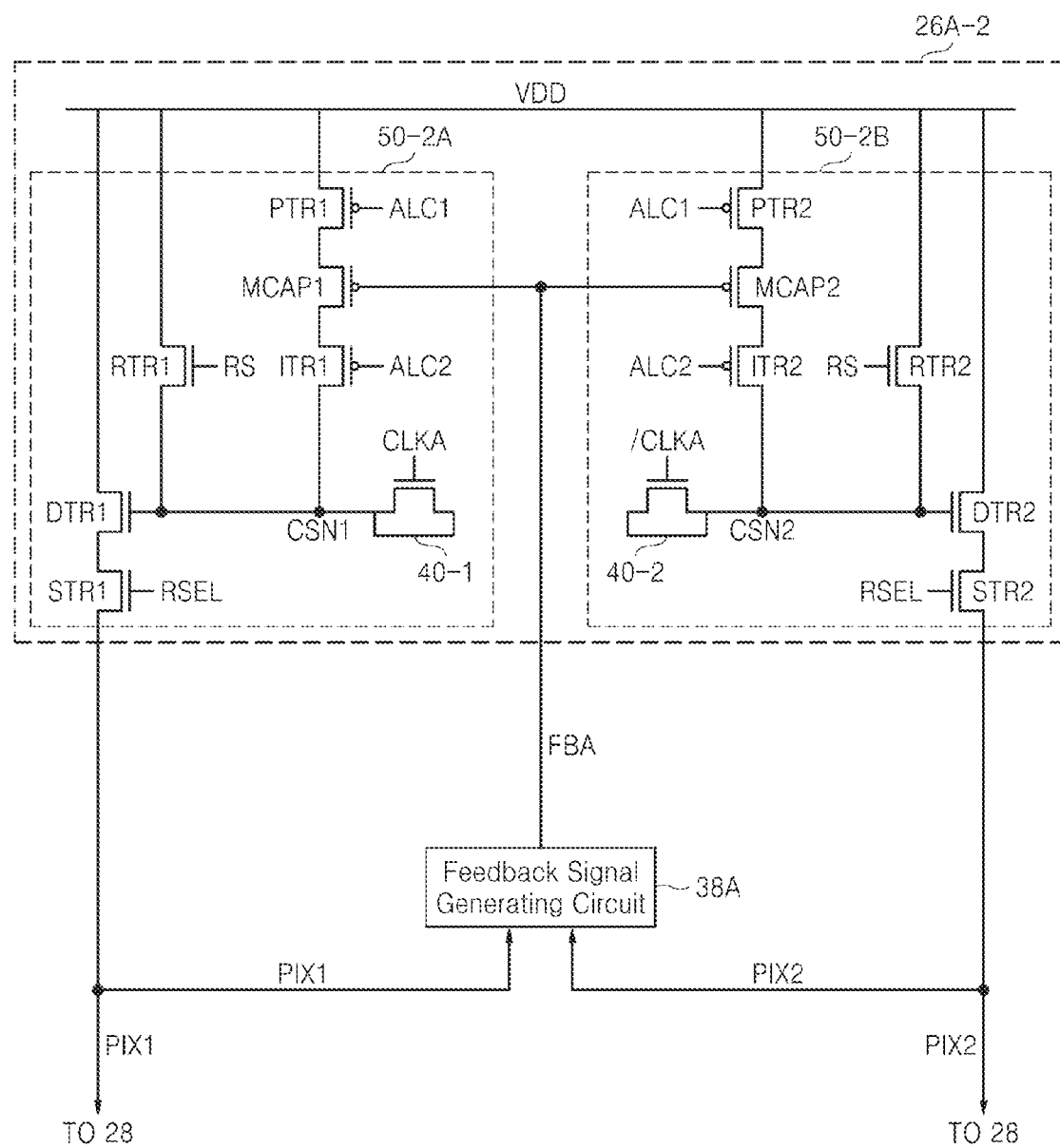
FIG. 7 is a circuit diagram according to another example embodiment of the unit pixel and the feedback signal generating circuit illustrated in FIG. 2.

FIG. 7 is a circuit diagram according to another example embodiment of the unit pixel and the feedback signal generating circuit illustrated in FIG. 2. Referring to FIGS. 2, 3, and 7, a unit pixel 26A-2 according to another example embodiment of the unit pixel 26 of FIG. 2 may include a first sub pixel 50-2A and a second sub pixel 50-2B.

Each of the first sub pixel 50-2A and the second sub pixel 50-2B may further include a transistor RTR1 or RTR2 for resetting the charge storage node CSN1 or CSN2 compared to each of the first sub pixel 50-1A and the second sub pixel 50-1B illustrated in FIG. 2. The transistor RTR1 or RTR2 may reset the charge storage node CSN1 or CSN2 in response to a reset signal RS.

Figure 8:
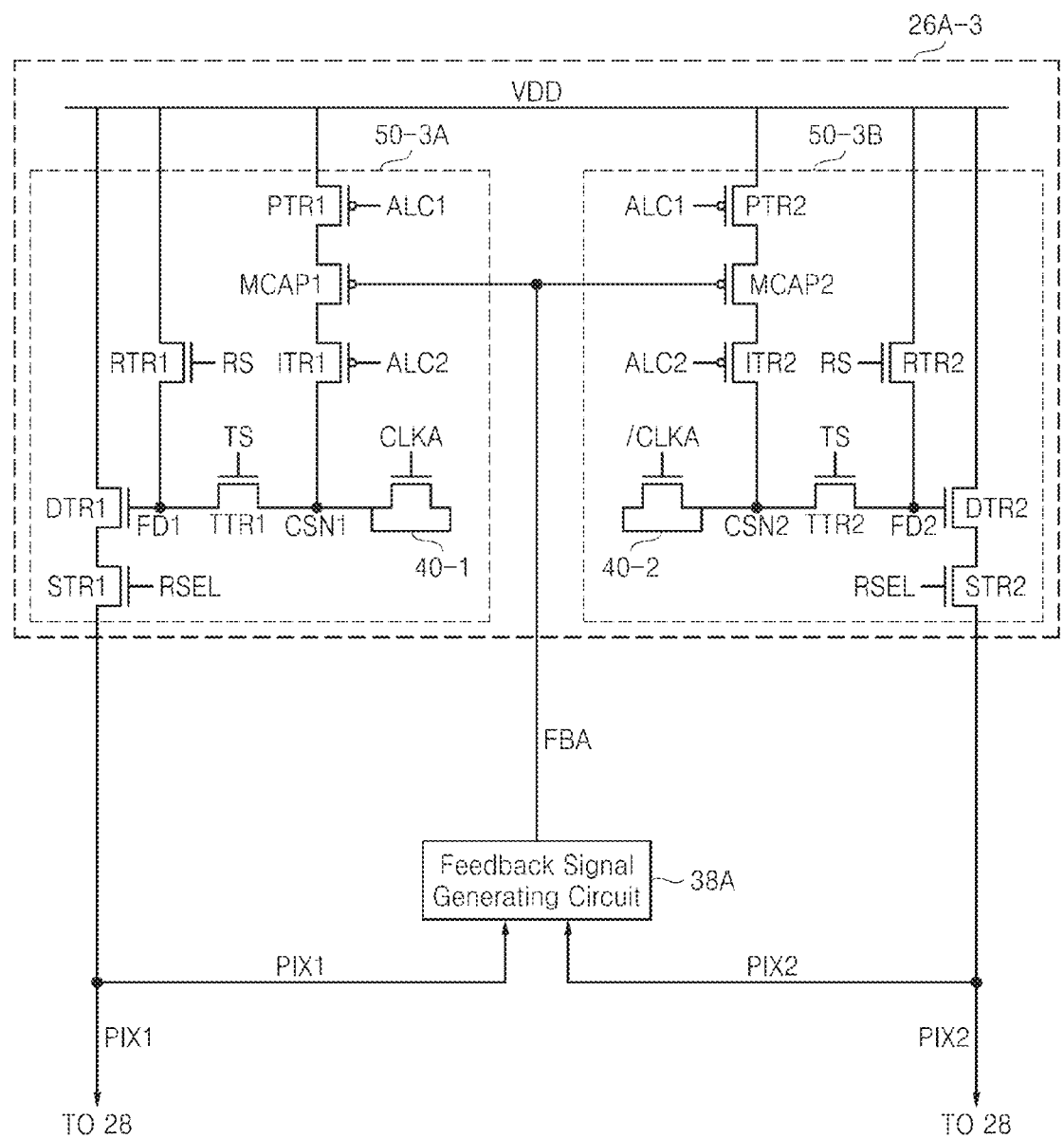
FIG. 8 is a circuit diagram according to still another example embodiment of the unit pixel and the feedback signal generating circuit illustrated in FIG. 2.

FIG. 8 is a circuit diagram according to still another example embodiment of the unit pixel and the feedback signal generating circuit illustrated in FIG. 2. Referring to FIGS. 2, 3, 7, and 8, a unit pixel 26A-3 according to still another example embodiment of the unit pixel 26 illustrated in FIG. 2 may include a first sub pixel 50-3A and a second sub pixel 50-3B.

Each of the first sub pixel 50-3A and the second sub pixel 50-3B may further include a transistor TTR1 or TTR2 for transmitting charges, generated by the photoelectric conversion element 40-1 or 40-2, to a floating diffusion node FD1 or FD2 compared to each of the first sub pixel 50-2A and the second sub pixel 50-2B illustrated in FIG. 7.

In this case, the charge storage node CSN1 or CSN2 and the floating diffusion node FD1 or FD2 may denote different nodes from each other. The transistor TTR1 or TTR2 may be switched by a transmission signal TS.

Figure 9:
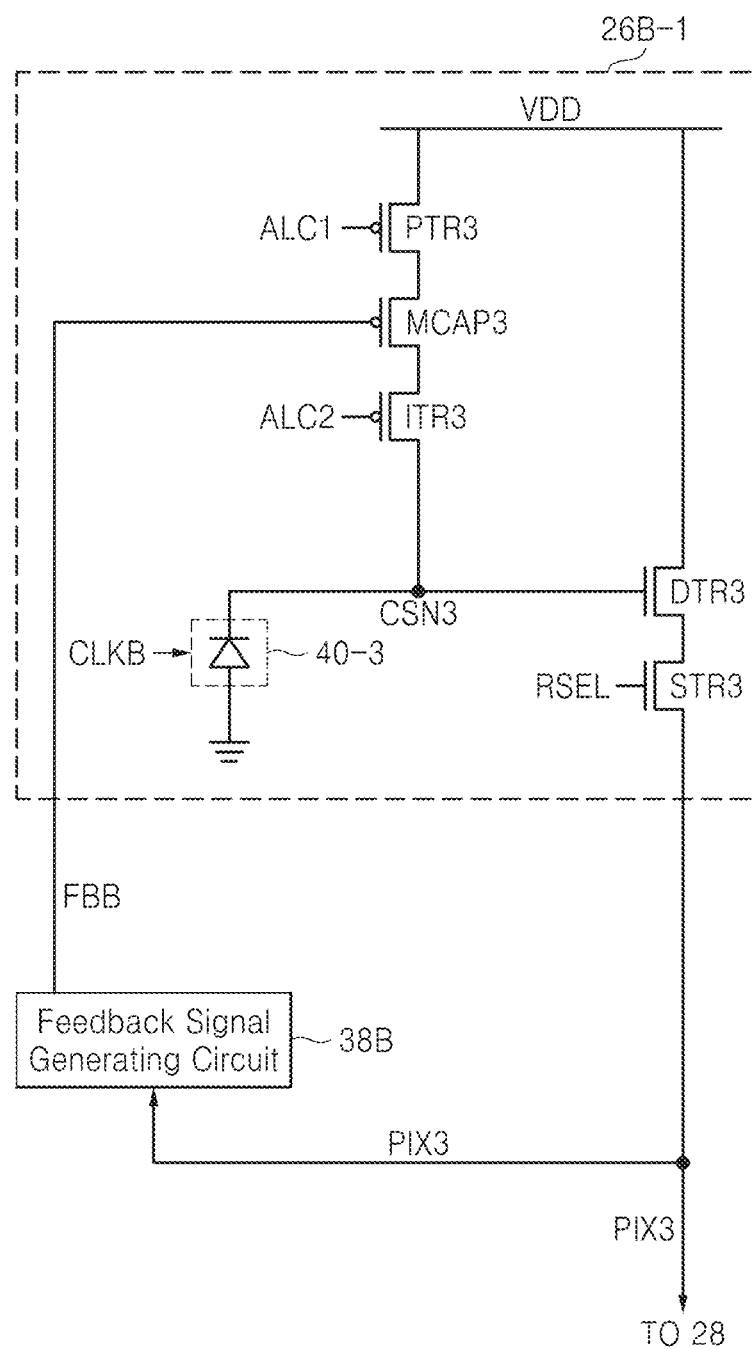
FIG. 9 is a circuit diagram according to still another example embodiment of the unit pixel and the feedback signal generating circuit illustrated in FIG. 2.

FIG. 9 is a circuit diagram according to still another example embodiment of the unit pixel and the feedback signal generating circuit illustrated in FIG. 2. Referring to FIGS. 2, 3, and 9, a structure and an operation of the unit pixel 26B-1 according to an example embodiment of the unit pixel 26 illustrated in FIG. 2 are substantially the same as a structure and an operation of the sub pixel 50-1A or 50-1B illustrated in FIG. 3. That is, the unit pixel 26B-1 may have a one-tap structure.

A pixel signal PIX3 output from the unit pixel 26B-1 may be transmitted to the readout circuit 28 and the feedback signal generating circuit 38B. The feedback signal generating circuit 38B may generate a feedback signal FBB based on a pixel signal PIX3. A structure and an operation of the feedback signal generating circuit 38B will be explained in detail referring to FIGS. 10 and 11.

Figure 10:
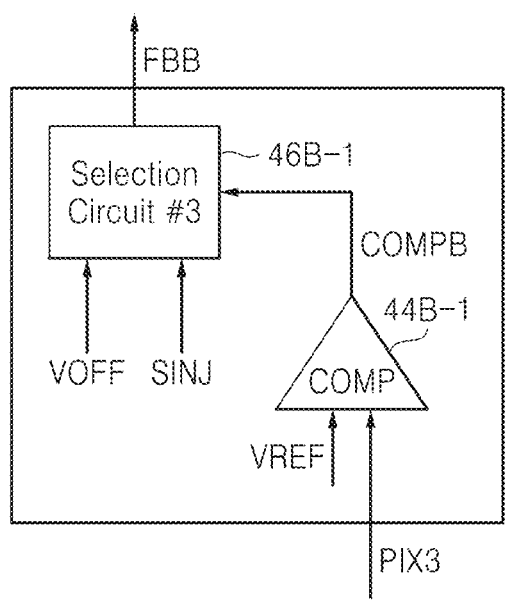
FIG. 10 is a block diagram according to an example embodiment of the feedback signal generating circuit illustrated in FIG. 9.

FIG. 10 is a block diagram according to an example embodiment of the feedback signal generating circuit illustrated in FIG. 9. Referring to FIGS. 9 and 10, a feedback signal generating circuit 38B-1 according to still another example embodiment of the feedback signal generating circuit 38B of FIG. 9 may include a comparator 44B-1 and a selection circuit 46B-1.

The comparator 44B-1 may compare the pixel signal PIX3 with a reference signal VREF and transmit a comparison signal COMPB, generated according to a result of the comparison, to the selection circuit 46B-1. The selection circuit 46B-1 selects one of the default voltage signal VOFF and the charge supply control signal SINJ based on the comparison signal COMPB, and outputs the selected signal as the feedback signal FBB.

Figure 11:
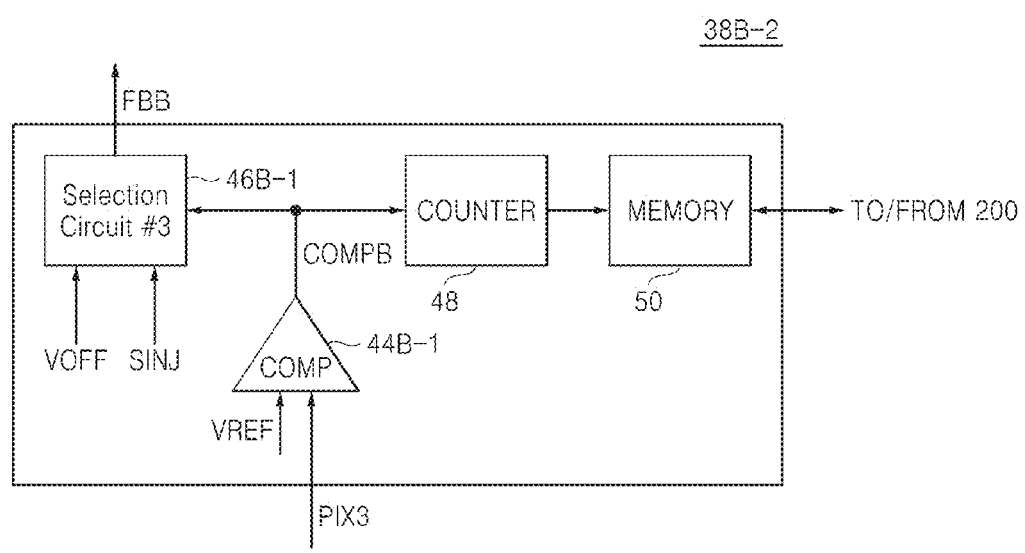
FIG. 11 is a block diagram according to another example embodiment of the feedback signal generating circuit illustrated in FIG. 9.

FIG. 11 is a block diagram according to another example embodiment of the feedback signal generating circuit illustrated in FIG. 9. Referring to FIGS. 9 to 11, a feedback signal generating circuit 38B-2 according to another example embodiment of the feedback signal generating circuit 38B of FIG. 9 may further include a counter 48 and a memory 50, compared to the feedback signal generating circuit 38B-1 of FIG. 10.

The counter 48 may count a transition number of the comparison signal COMPB. The memory 50 may store a count value of the counter. The count value may include information on a number that charges, e.g., holes, are supplied to a charge storage node CSN3 to decrease noises caused by ambient light in the unit pixel 26B-1. The count value stored in the memory 50 may be used for the ISP (200 of FIG. 1) to process the image data IDATA.

Figure 12:
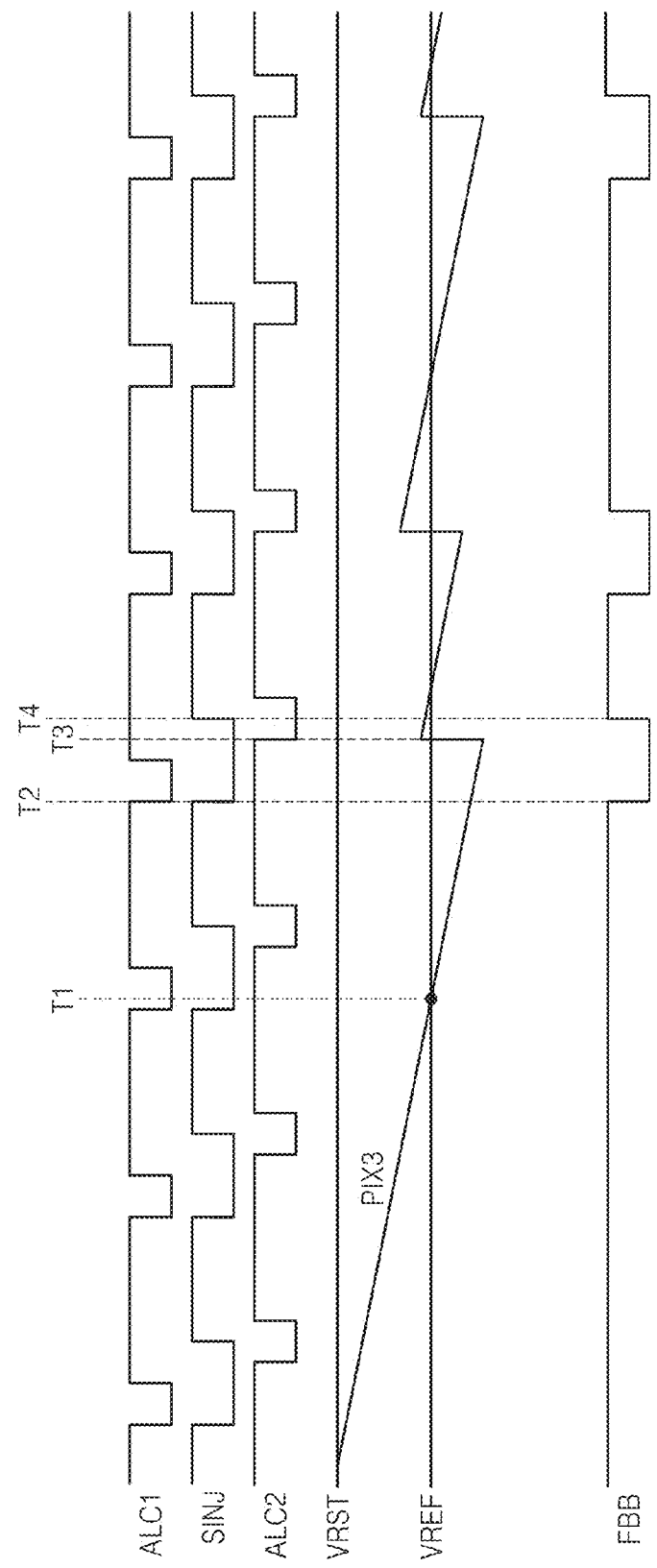
FIG. 12 is a timing diagram according to an example embodiment of signals illustrated in FIGS. 9 to 11.

FIG. 12 is a timing diagram according to an example embodiment of signals illustrated in FIGS. 9 to 11. Referring to FIGS. 5, and 9 to 12, the first ALC control signal ALC1, the charge supply control signal SINJ, and the second ALC control signal ALC2 may be supplied in the same form as shown in FIG. 5.

As a photoelectric conversion element 40-3 generates photo charges, a level of a pixel signal PIX3 gets lower and lower from a reset voltage level VRST.

A level of the pixel signal PIX3 becomes identical to a level of the reference signal VREf at a first point of time T1, and becomes lower than the level of the reference signal VREF after the first point of time T1. In this case, a level of the comparison signal COMPB transits and the selection circuit 46B-1 outputs the charge supply control signal SINJ as the feedback signal FBB by the transited comparison signal COMPB.

As both a level of the feedback signal FBB and a level of the charge supply control signal SINJ transit at a second point of time T2, a charge storage element MCAP3 may store charges, e.g., holes, supplied from a charge supply source, e.g., a power line VDD, through a transistor PTR3.

As the second ALC control signal ALC2 transits at a third point of time T3, a transistor ITR3 may supply charges, e.g., holes, stored in the charge storage element MCAP3 to a charge storage node CSN3 in response to the second ALC control signal ALC2. The charges, e.g., holes, supplied from the charge storage element MCAP3 increases a level of the pixel signal PIX3.

Photo charges generated by the photoelectric conversion element 40-3 lowers back a level of the pixel signal PIX3, and when the level of the pixel signal PIX3 gets lower than a level of the reference signal VREF, operations performed between the first point of time T1 and the third point of time T3 are repeated. That is, an ALC operation of a different number by pixel may be performed.

A level of the feedback signal FBB at a fourth point of time T4 transits together with a level of the charge supply control signal SINJ.

Figure 13:
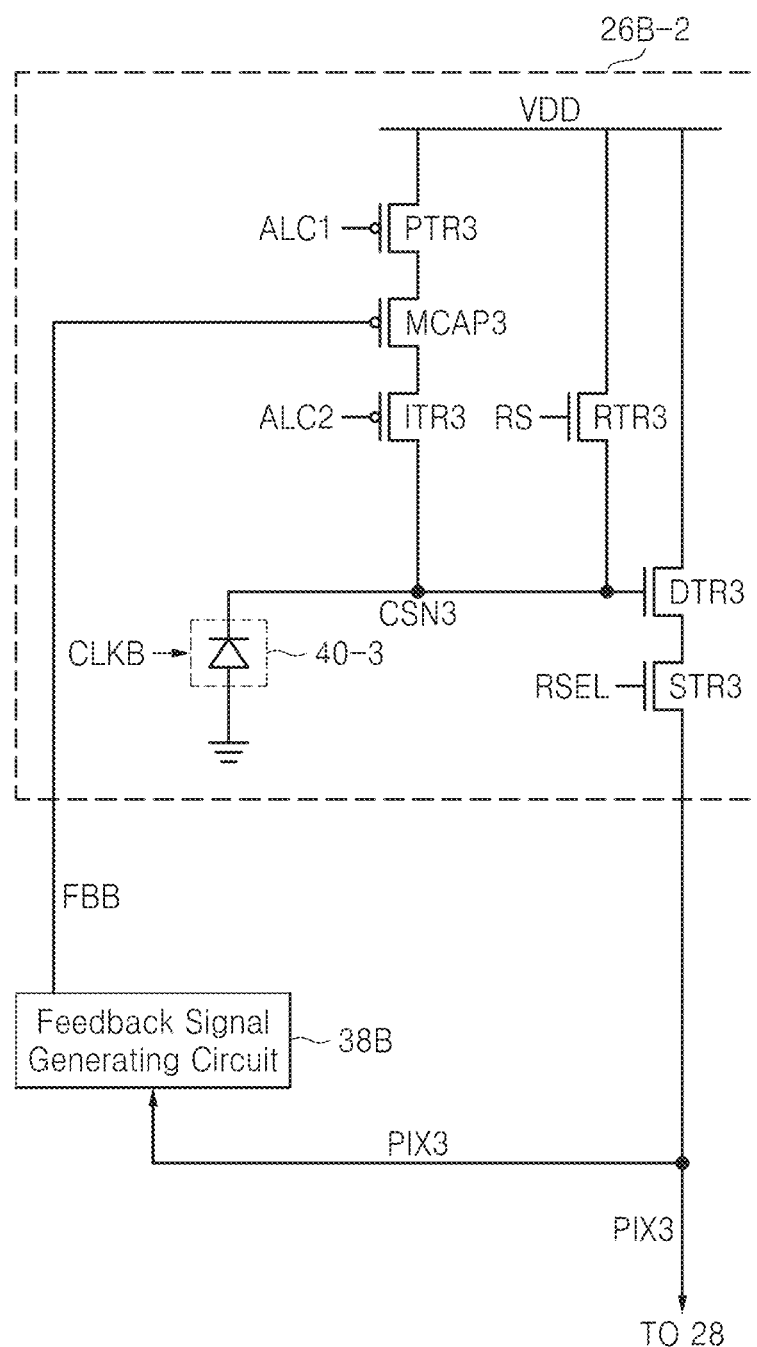
FIG. 13 is a circuit diagram according to still another example embodiment of the unit pixel and the feedback signal generating circuit illustrated in FIG. 2.

FIG. 13 is a circuit diagram according to still another example embodiment of the unit pixel and the feedback signal generating circuit illustrated in FIG. 2. Referring to FIGS. 2, 7, and 13, a structure and an operation of a unit pixel 26B-2 according to still another example embodiment of the unit pixel 26 illustrated in FIG. 2 are substantially the same as a structure and an operation of the first sub pixel 50-2A illustrated in FIG. 7.

Figure 14:
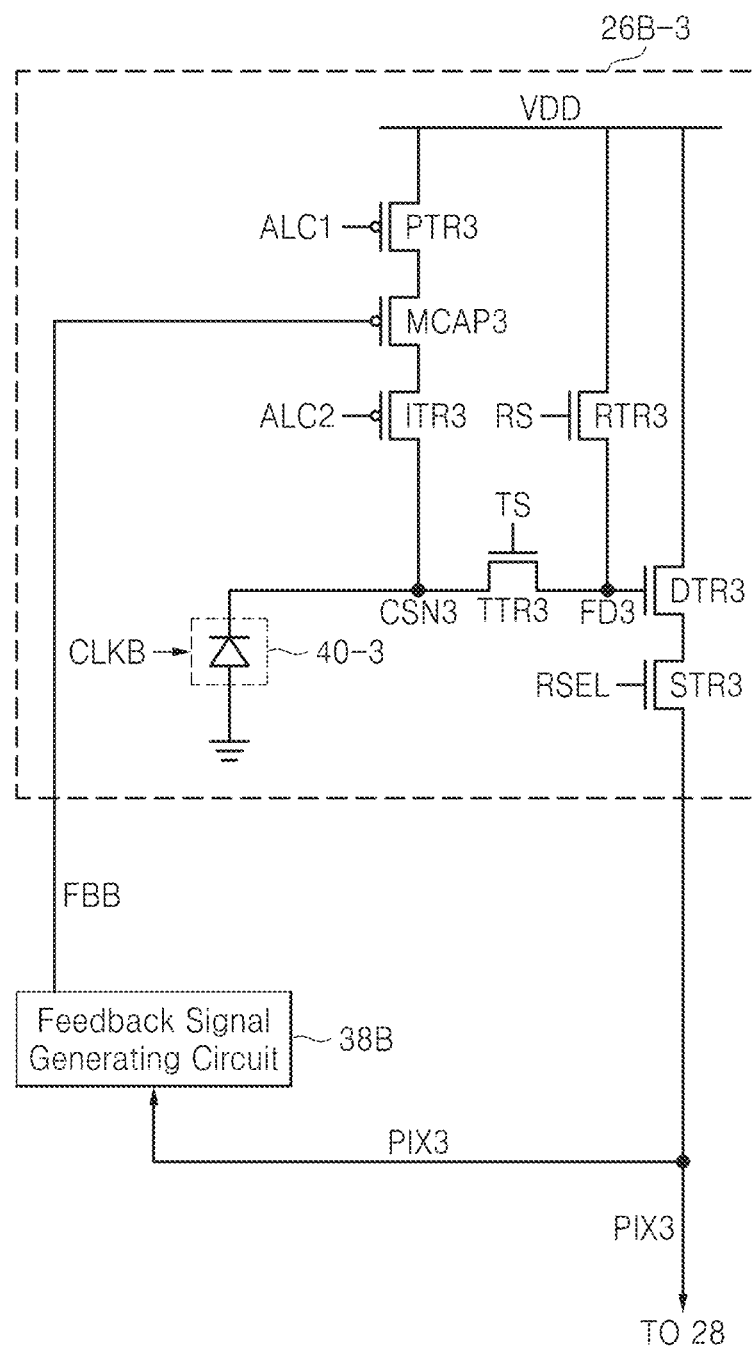
FIG. 14 is a circuit diagram according to still another example embodiment of the unit pixel and the feedback signal generating circuit illustrated in FIG. 2.

FIG. 14 is a circuit diagram according to still another example embodiment of the unit pixel and the feedback signal generating circuit illustrated in FIG. 2. Referring to FIGS. 2, 8, and 14, a structure and an operation of a unit pixel 26B-3 according to still another example embodiment of the unit pixel 26 illustrated in FIG. 2 are substantially the same as a structure and an operation of the first sub pixel 50-3A illustrated in FIG. 8.

Figure 15:
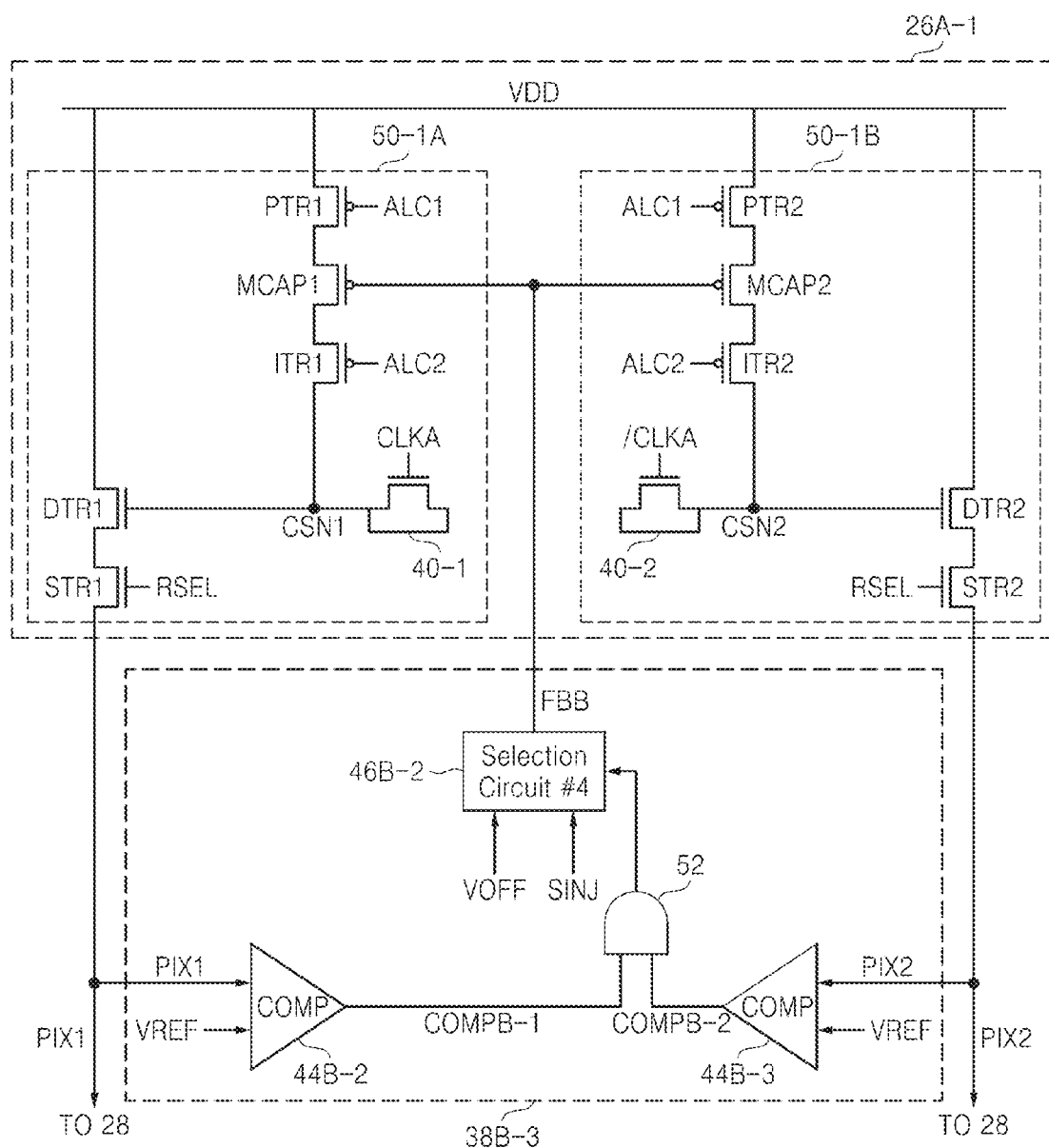
FIG. 15 is a circuit diagram according to still another example embodiment of the unit pixel and the feedback signal generating circuit illustrated in FIG. 2.

FIG. 15 is a circuit diagram according to still another example embodiment of the unit pixel and the feedback signal generating circuit illustrated in FIG. 2. Referring to FIGS. 2 and 15, a feedback signal generating circuit 38B-3 according to still another example embodiment of the feedback signal generating circuit 38 of FIG. 2 may include comparators 44B-2 and 44B-3, a logic circuit 52, and a selection circuit 46B-2.

The comparator 44B-2 may compare a pixel signal PIX1 with the reference signal VREF, and transmit a comparison signal COMPB-1, generated by a result of the comparison, to the logic circuit 52. The comparator 44B-3 compares a pixel signal PIX2 with the reference signal VREF, and transmits a comparison signal COMPB-2 generated according to a result of the comparison to the logic circuit 52.

The logic circuit 52 may transmit a result of performing a logic operation on the comparison signal COMPB-1 and the comparison signal COMPB-2 to the selection circuit 44B-2. According to an example embodiment, the logic circuit 52 may be embodied in an AND gate, and in this case the logic circuit 52 may output a high level or '1' when a level of the pixel signal PIX1 is lower than a level of the reference signal VREF and a level of the pixel signal PIX2 is lower than a level of the reference signal VREF.

The selection circuit 46B-2 may select one of the default voltage signal VOFF and the charge supply control signal SINJ based on an output value of the logic circuit 52, and output the selected signal as the feedback signal FBB.

Figure 16:
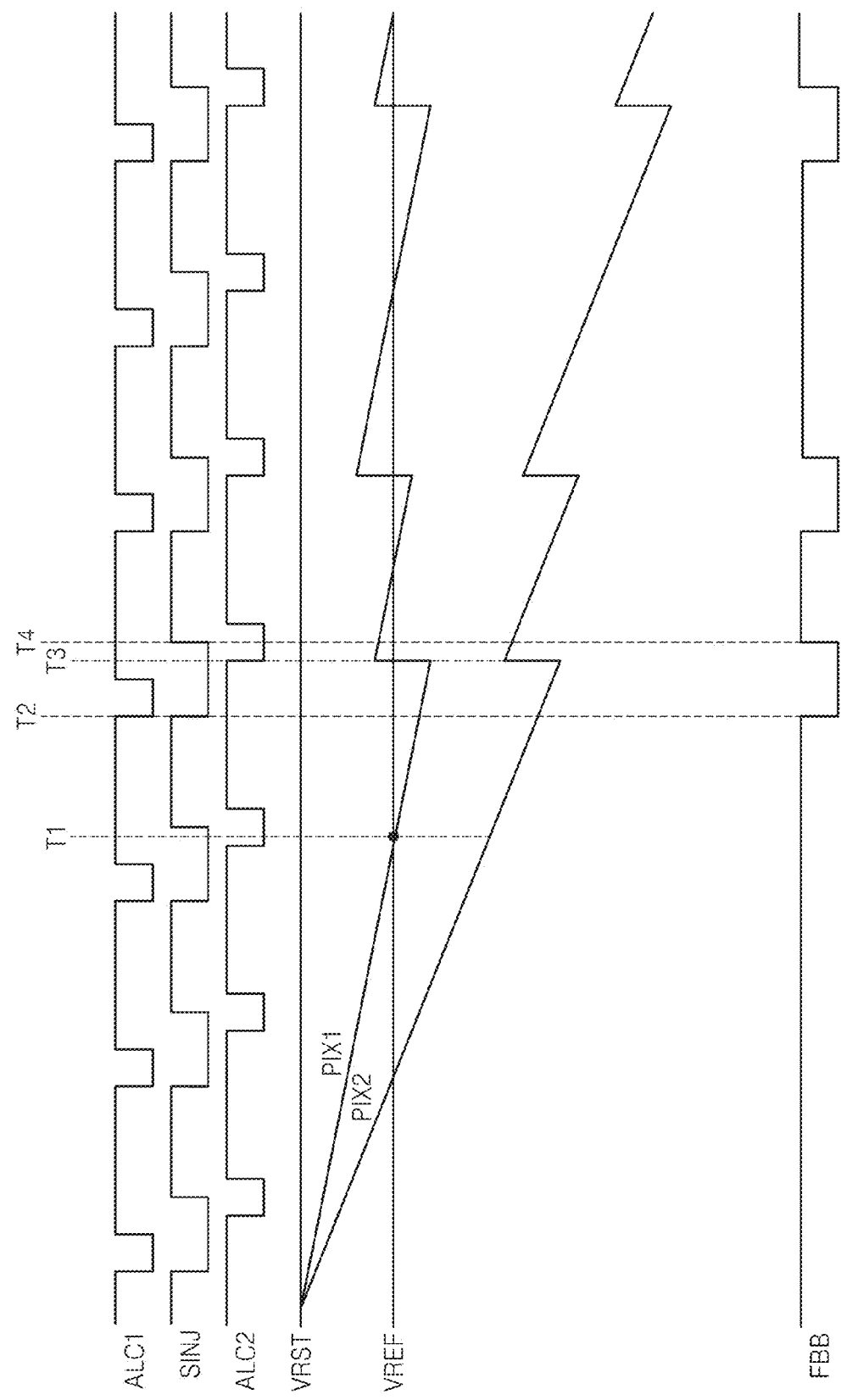
FIG. 16 is a timing diagram according to an example embodiment of signals illustrated in FIG. 15.

FIG. 16 is a timing diagram according to an example embodiment of signals illustrated in FIG. 15. Referring to FIGS. 15 and 16, the first ALC control signal ALC1, the charge supply control signal SINJ, and the second ALC control signal ALC2 may be supplied in the same form as shown in FIG. 5.

As the photoelectric conversion element 40-1 generates photo charges, a level of the pixel signal PIX1 gets lower and lower from the reset voltage level VRST.

A level of the pixel signal PIX1 becomes identical to a level of the reference signal VREF at a first point of time T1, and gets lower than the level of the reference signal VREF after the first point of time T1. That is, a level of the pixel signal PIX1 gets lower than the level of the reference signal VREF, and a level of the pixel signal PIX2 also gets lower than the level of the reference signal VREF after the first point of time T1.

In this case, the logic circuit 52 may output a high level or '1' based on a comparison signal COMPB-1 and a comparison signal COMPB-2, and the selection circuit 46B-1 may output the charge supply control signal SINJ as the feedback signal FBB by an output signal output from the logic circuit 52.

As both a level of the feedback signal FBB and a level of the charge supply control signal SINJ transit at a second point of time T2, the charge storage element MCAP1 or MCAP2 may store charges, e.g., holes, supplied from a charge supply source, e.g., a power line VDD, through the transistor PTR1.

As the second ALC control signal ALC2 transits to a low level or '0' at a third point of time T3, a transistor ITR1 or ITR2 may supply charges, e.g., holes, stored in the charge storage element MCAP1 or MCAP2 to the charge storage node CSN1 or CSN2 in response to the second ALC control signal ALC2. The charges, e.g., holes, supplied from the charge storage element MCAP1 or MCAP2 increase a level of the pixel signal PIX1 or PIX2.

Photo charges generated by the photoelectric conversion element 40-1 or 40-2 lower back the level of the pixel signal PIX1 or PIX2, and operations performed between a first point of time T1 and a third point of time T3 are repeated when the level of the pixel signal PIX1 or PIX2 gets lower than a level of the reference signal VREF. That is, different number of an ALC operation may be performed by pixel. A level of the feedback signal FBB transits to a high level or '1' together with a level of the charge supply control signal SINJ at a fourth point of time T4.

Figure 17:
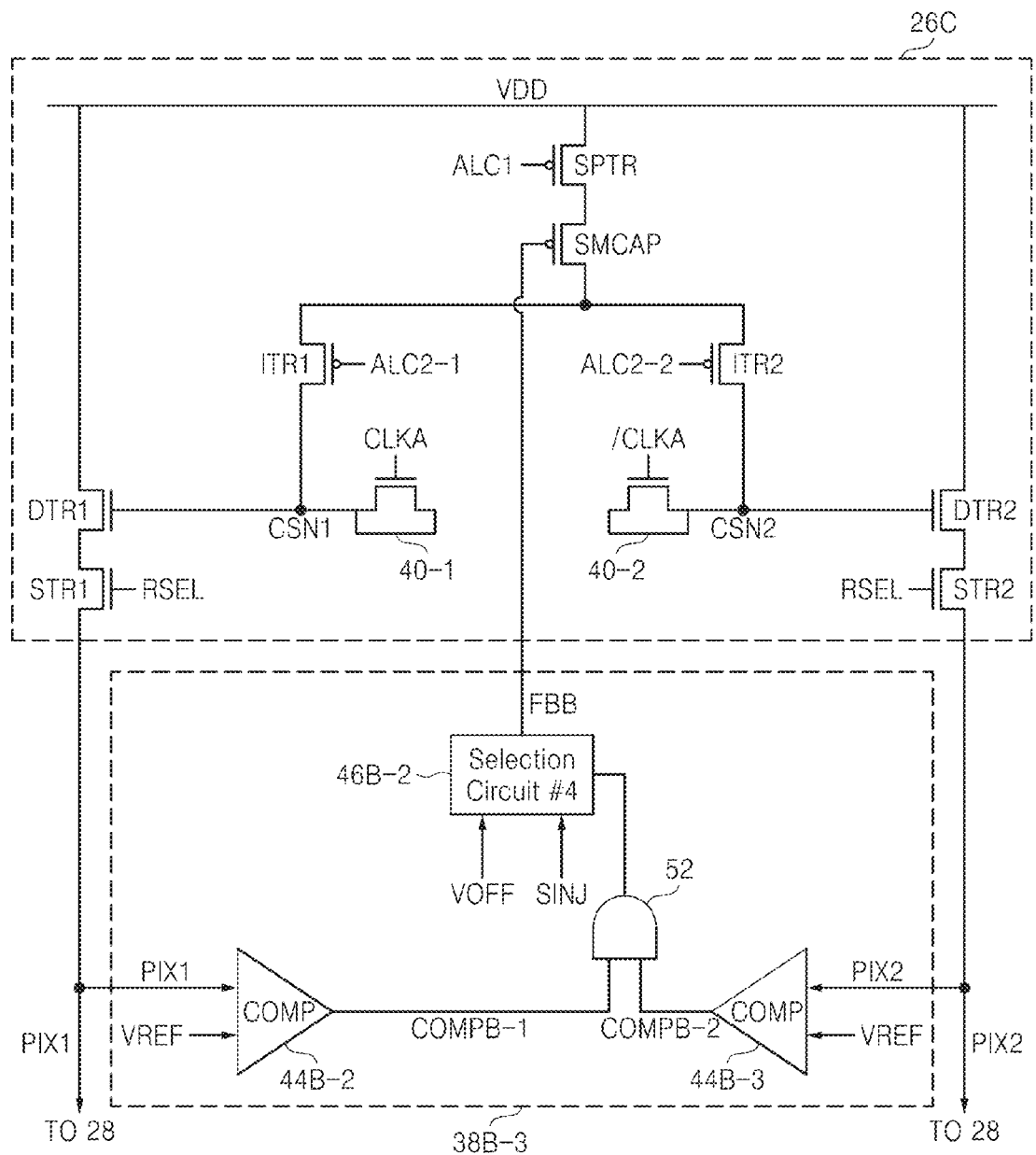
FIG. 17 is a circuit diagram according to still another example embodiment of the unit pixel and the feedback signal generating circuit illustrated in FIG. 2.

FIG. 17 is a circuit diagram according to still another example embodiment of the unit pixel and the feedback signal generating circuit illustrate in FIG. 2. Referring to FIGS. 2, 15 and 17, two photoelectric conversion elements 40-1 and 40-2, included in a unit pixel 26C according to still another example embodiment of the unit pixel 26 of FIG. 2, share a transistor SPTR and a charge storage element SMCAP.

A structure and an operation of the transistor SPTR and the charge storage element SMCAP are substantially the same as a structure and an operation of the transistor PTR1 or PTR2 and the charge storage element MCAP1 or MCAP2 illustrated in FIG. 15.

A transistor ITR1 and a transistor ITR2 may supply charges, e.g., holes, to the charge storage node CSN1 or CSN2 at different timings in response to each of the second ALC control signals ALC2-1 and ALC2-1, which are different from each other, respectively. An operation of the transistor ITR1 and the transistor ITR2 will be described in detail referring to FIG. 18.

Figure 18:
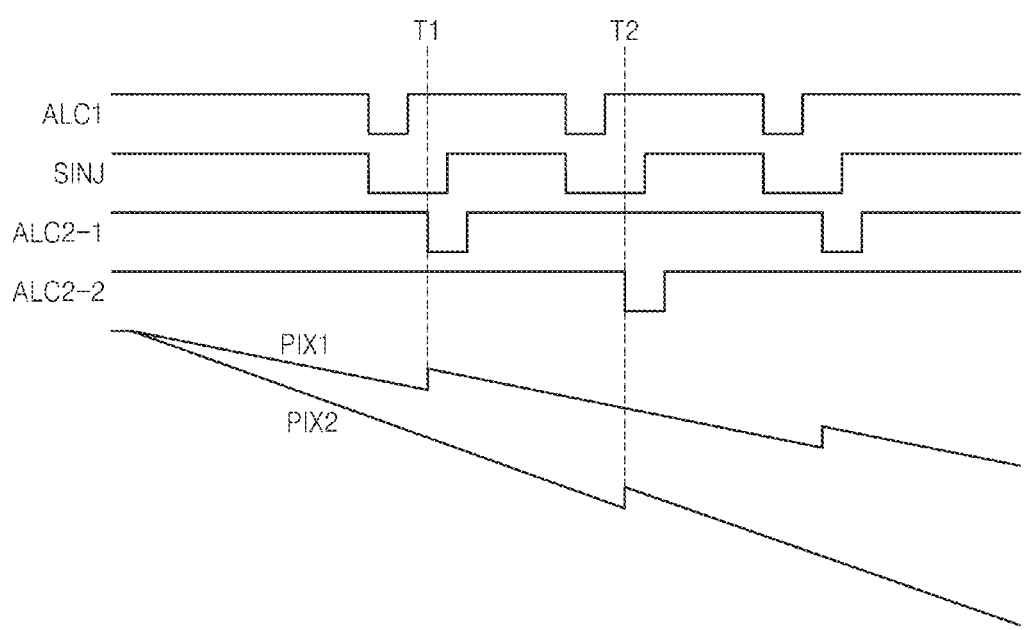
FIG. 18 is a timing diagram according to an example embodiment of signals illustrated in FIG. 17.

FIG. 18 is a timing diagram according to an example embodiment of signals illustrated in FIG. 17. Referring to FIGS. 17 and 18, a second ALC control signal ALC2-1 transits to a low level or '0' at a first point of time T1, and a second ALC control signal ALC2-2 transits to a low level or '0' at a second point of time T2. That is, each of the transistors ITR1 and ITR2 may be turned on at a different timing and supply charges, e.g., holes, to the charge storage node CSN1 or CSN2 at a different timing.

Figure 19:
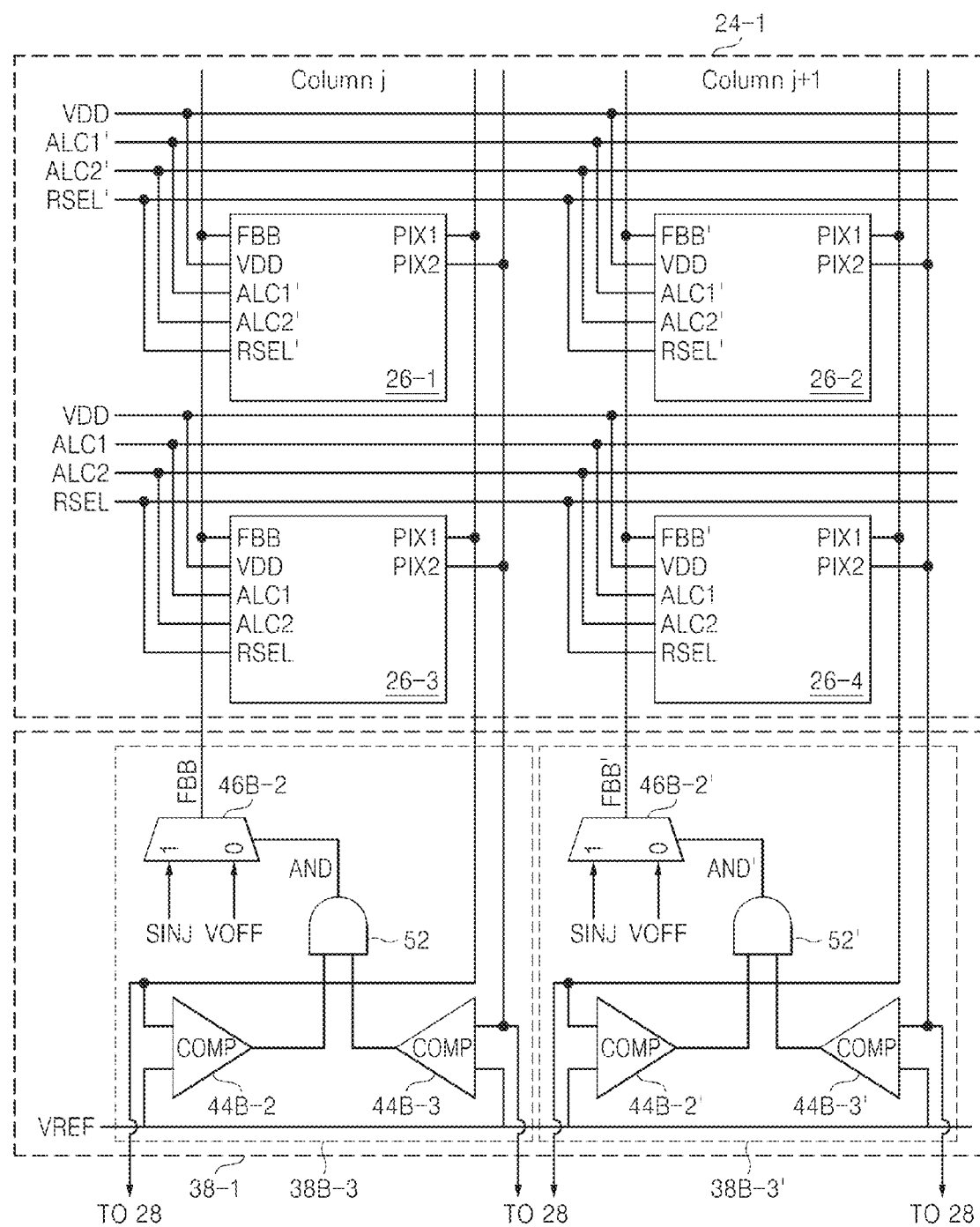
FIG. 19 is an example embodiment of a pixel array and the feedback signal generating circuit illustrated in FIG. 2.

FIG. 19 is an example embodiment of the pixel array and the feedback signal generating circuit illustrated in FIG. 2.

Referring to FIGS. 2 and 19, a pixel array 24-1 according to an example embodiment of the pixel array 24 illustrated in FIG. 2, and a feedback signal generating circuit 38-1 according to an example embodiment of the feedback signal generating circuit 38 illustrated in FIG. 2 are illustrated. For convenience of explanation, it is illustrated that the pixel array 24-1 includes four pixels 26-1 to 26-4.

A unit pixel 26-1 and a unit pixel 26-2 are located in the same row line as each other, and a unit pixel 26-3 and a unit pixel 26-4 are located in the same row line as each other. The unit pixel 26-1 and the unit pixel 26-3 are located in the same column line as each other, e.g., a $j^{th}$ column line, and the unit pixel 26-2 and the unit pixel 26-4 are located in the same column line, e.g., $j+1^{th}$ column line.

For convenience of explanation, it is assumed that the feedback signal generating circuit 38-1 includes a first feedback signal generating circuit 38B-3 and a second feedback signal generating circuit 38B-3'.

The first feedback signal generating circuit 38B-3 may supply a feedback signal FBB to each of the pixels 26-1 and 26-3 included in the same column line, e.g., $j^{th}$ column line.

The second feedback signal generating circuit 38B-3' may supply a feedback signal FBB' to each of the pixels 26-2 and 26-4 included in the same column line, e.g., $j+1^{th}$ column line. That is, pixels included in the same column line may share the feedback signal generating circuit 38B-3 or 38B-3'.

Figure 20:
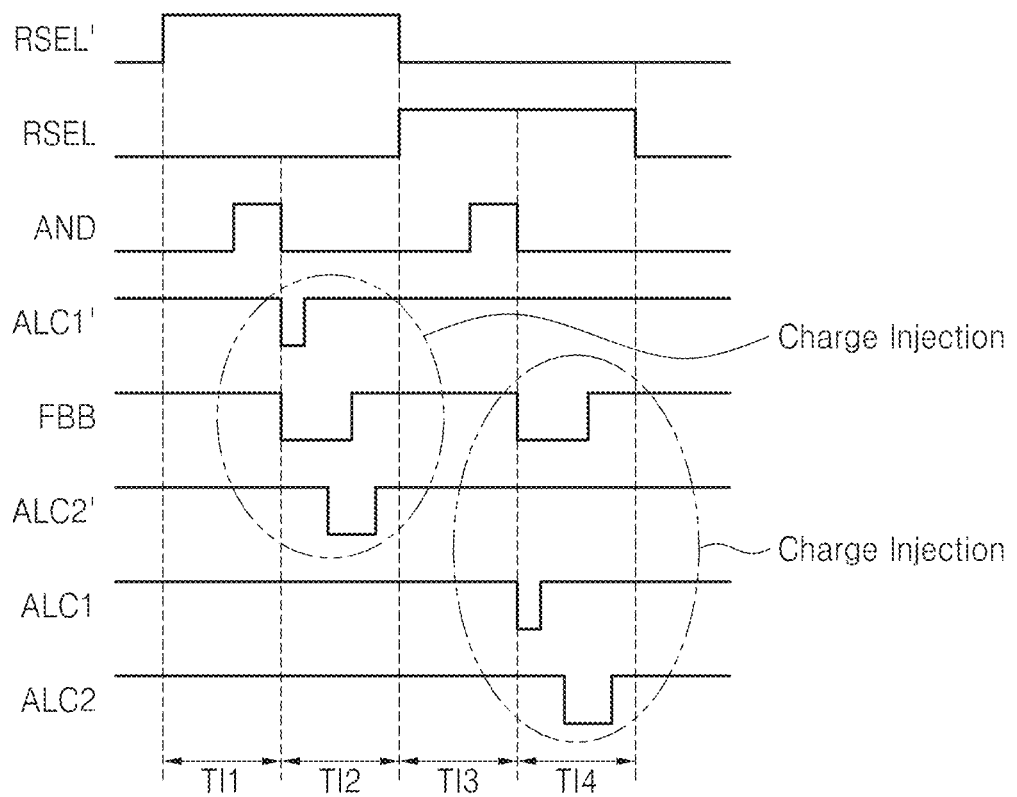
FIG. 20 is a timing diagram according to an example embodiment of signals illustrated in FIG. 19.

FIG. 20 is a timing diagram according to an example embodiment of signals illustrated in FIG. 19. Referring to FIGS. 19 and 20, a timing diagram illustrated in FIG. 20 depicts a timing of signals related to the pixels 26-1 and 26-3 included in the $j^{th}$ column line.

While a selection signal RSEL' retains a first level, e.g., a high level or '1', the unit pixel 26-1 may be activated.

In a first section TI1, when a level of the pixel signals PIX1 and PIX2 output from the unit pixel 26-1 gets lower than a level of the reference signal VREF, a level of an output signal (AND) of the logic circuit 52 may change. A level of the feedback signal FBB may be changed by the level-changed output signal (AND) of the logic circuit 52.

In order to reduce noises caused by ambient light in a second section TI2, charges, e.g., holes, may be supplied to a charge storage node of the unit pixel 26-1 in response to the first ALC control signal ALC1', the feedback signal FBB, and the second ALC control signal ALC2'.

While a selection signal RSEL' transits to a second level, e.g., a low level or '0', and a selection signal RSEL retains a first level, e.g., a high level or '1', a unit pixel 26-3 may be activated.

In a third section TI3, when a level of output signals PIX1 and PIX2 output from the unit pixel 26-3 gets lower than a level of the reference signal VREF, a level of the output signal (AND) of the logic circuit 52 may change. A level of the feedback signal FBB may be changed by the level-changed output signal (AND) of the logic circuit 52.

In order to reduce noises caused by ambient light in a fourth section TI4, charges, e.g., holes, may be supplied to a charge storage node of the unit pixel 26-3 in repose to the first ALC control signal ALC1, the feedback signal FBB, and the second ALC control signal ALC2.

Figure 21:
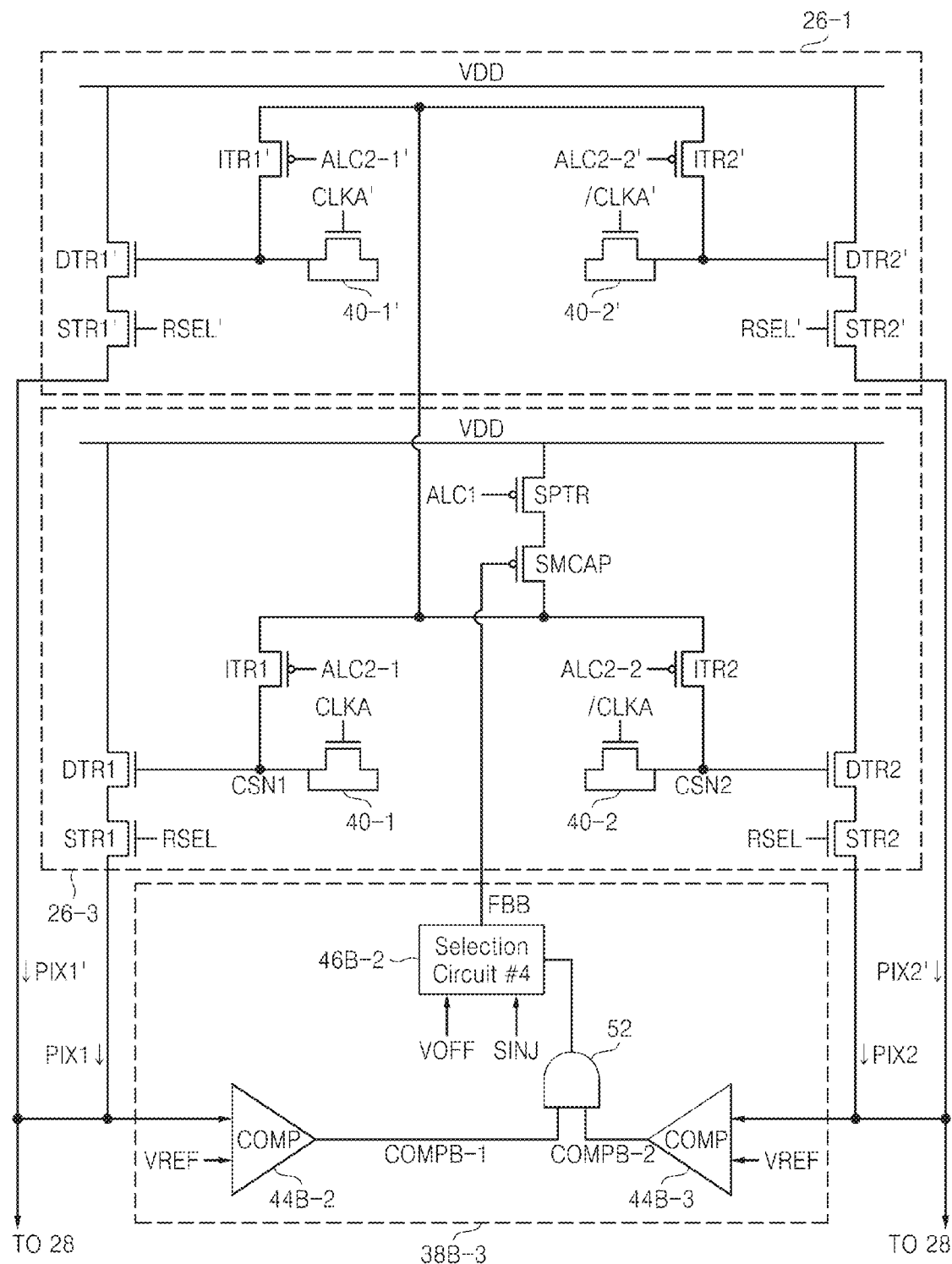
FIG. 21 is a circuit diagram according to a modified example of unit pixels and a feedback signal generating circuit illustrated in FIG. 19.

FIG. 21 is a circuit diagram according to a modified example of the unit pixels and the feedback signal generating circuit illustrated in FIG. 19. Referring to FIGS. 2, 17, 19 and 20, except that the unit pixel 26-1 and the unit pixel 26-3 share a transistor SPTR and a charge storage element SMCAP, a structure and an operation of the unit pixel 26-3 are substantially the same as a structure and an operation of the unit pixel 26C illustrated in FIG. 17.

Since the unit pixel 26-1 and the unit pixel 26-3 share the transistor SPTR and the charge storage element SMCAP, the unit pixel 26-1 may not additionally include a component corresponding to the transistor SPTR and the charge storage element SMCAP. That is, the unit pixel 26-1 and the unit pixel 26-3 may share the transistor SPTR and the charge storage element SMCAP besides the feedback signal generating circuit 38B-3. In this case, the unit pixel 26-1 does not need to be provided with the feedback signal FBB.

A structure and an operation of switches ITR1', ITR2', DTR1', DTR2', STR1', and STR2' included in the unit pixel 26-1, and photoelectric conversion elements 40-1' and 40-2' are substantially the same as a structure and an operation of switches ITR1, ITR2, DTR1, DTR2, STR1 and STR2, and photoelectric conversion elements 40-1 and 40-2, respectively.

The unit pixel 26-1 may be provided with second ALC control signals ALC2-1' and ALC2-2' having different timings instead of the second ALC control signal ALC2' of FIG. 19 from the ALC control signal generating circuit 36, and the unit pixel 26-3 may be provided with second ALC control signals ALC2-1 and ALC-2 having different timings instead of the second ALC control signal ALC2 illustrated in FIG. 19 from the ALC control signal generating circuit 36.

Figure 22:
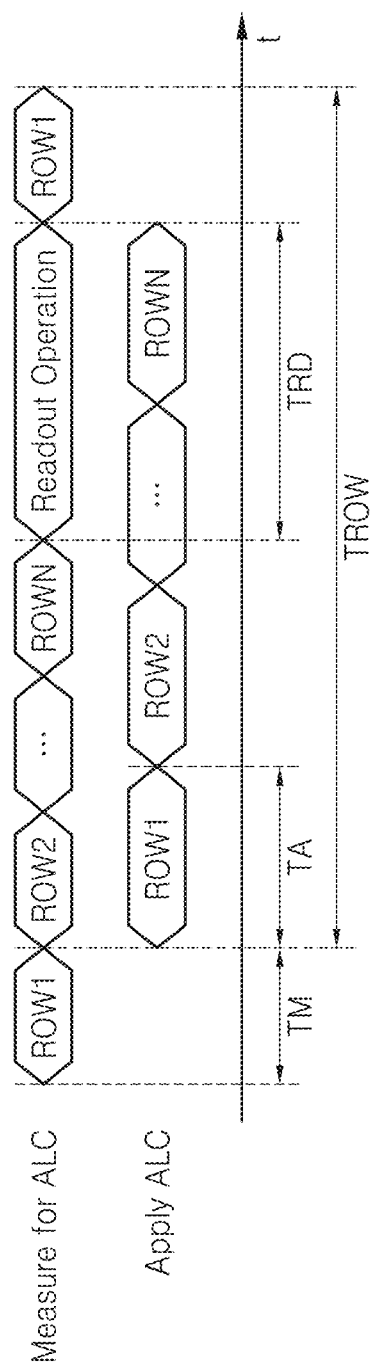
FIG. 22 is a modified example of a timing diagram illustrated in FIG. 20.

FIG. 22 is a modified example of the timing diagram illustrated in FIG. 20. Referring to FIGS. 19 and 20, a first section TB of FIG. 20 may be defined as a section performing measurement for an ALC operation, and a second section TI2 may be defined as a section where an ALC operation is applied according to a result of the measurement, e.g., an output signal (AND) of the logic circuit 52, at the first section TI1, i.e., a section in which a charge, e.g., hole, is injected to a charge storage node.

Referring to FIGS. 19, 20, and 22, unlike FIG. 20, measurement for an ALC operation and application of the ALC operation may be performed in parallel. For example, measurement for the ALC operation in a specific row, e.g., ROW2, and application of the ALC operation in a different row, e.g., ROW 1, may be simultaneously performed.

According to an example embodiment, the row decoder 34, included in the image sensor 100 illustrated in FIG. 2, may include a sub row decoder (not shown) for driving row lines, performing measurement for an ALC operation, and an additional sub row decoder (not shown) for driving row lines, performing application of the ALC operation. In addition, measurement for the ALC operation is performed separately from application of the ALC operation, so that a feedback signal generating circuit 38B-3 or 38B-3' may further include a memory (not shown) for storing a result of the measurement, e.g., an output signal (AND) of the logic circuit 52, after performing measurement for the ALC operation. According to an example embodiment, the memory (not shown) may operate in a first in first out (FIFO) mode.

A length of a measurement section TM for performing measurement for an ALC operation with respect to each row, e.g., ROW 1, may be different from a length of an application section TA for performing application of the ALC operation with respect to each row, e.g., ROW 1.

The measurement section TM for performing measurement for an ALC operation with respect to each row, e.g., ROW1, is not overlapped with a section for readout of the pixel signals PIX1 and PIX2.

An application section TA for performing application of the ALC operation with respect to each row, e.g., ROW1, may be overlapped with a section for readout of the pixel signals PIX1 and PIX2.

During row time TROW, measurement for one cycle of an ALC operation and application of the ALC operation may be performed with respect to each row ROW1 to ROWN.

Figure 23:
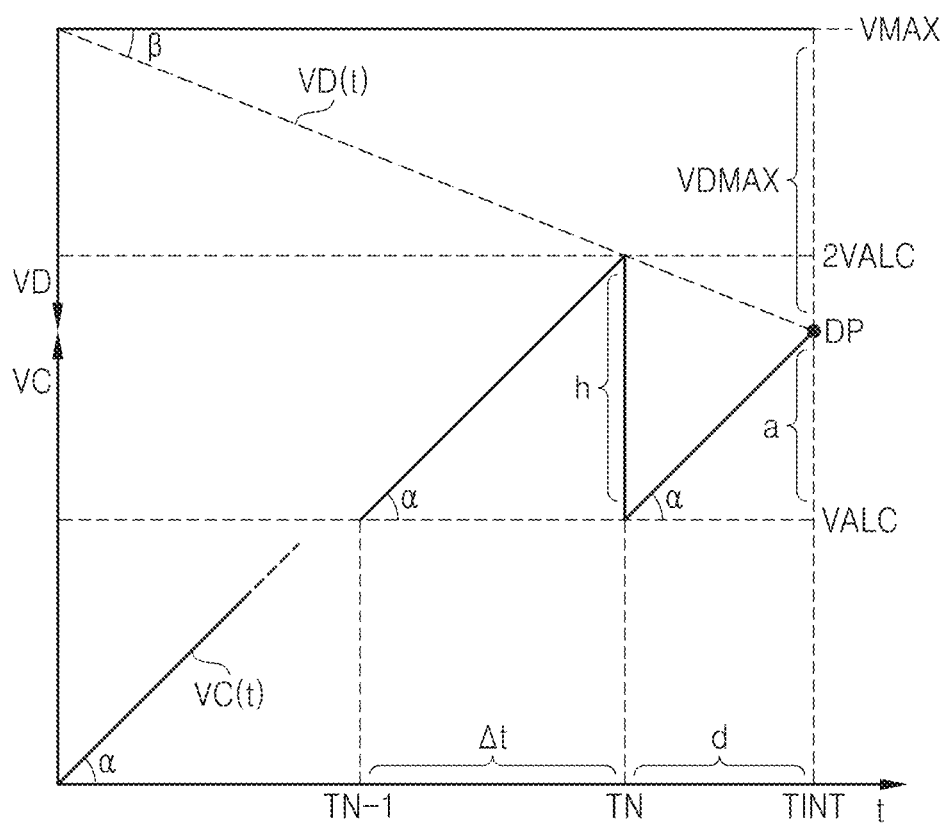
FIG. 23 is a graph for explaining an ambient light cancellation (ALC) operation number which may be performed during an integration section of pixels illustrated in FIG. 2.

FIG. 23 is a graph for explaining an operation frequency of ambient light cancellation (ALC) which may performed during an integration section of pixels illustrated in FIG. 2. Referring to FIGS. 2, 3, and 23, a pixel maximum capacity voltage VMAX may denote a voltage at which a pixel is saturated by a photo charge.

Integration time TINT may denote a time section in which a pixel performs a photoelectric conversion in one frame.

In FIG. 23, it is assumed that the ALC operation is performed N times, a $(N-1)^{th}$ ALC operation is performed at a first point of time TN-1, and a $N^{th}$ ALC operation is performed at a second point of time TN. At denotes an interval in which the ALC operation is performed. d denotes time running to the integration time TINT after a final $N^{th}$ ALC operation is performed.

A common offset voltage VC may denote a voltage value corresponding to a common component of the pixel signal PIX1 or PIX2 output from each of the sub pixels, e.g., 50-1A and 50-1B, included in each unit pixel 26. The common offset voltage VC may change according to VC(t) at an angle of α.

A differential voltage VD may denote a voltage value corresponding to a difference between the pixel signals PIX1 and PIX2 output from each of the sub pixel, e.g., 50-1A and 50-1B of FIG. 3, included in the each unit pixel 26. The differential voltage VD may change according to VD(t) at an angle of β.

An ALC threshold voltage h may denote a voltage value which becomes a reference of the ALC operation. According to an example embodiment, a voltage value of the reference signal VREF illustrated in FIGS. 10 to 12 and 15 to 17 may be set to be the same as the ALC threshold voltage h. An ALC voltage drop VALC may denote a voltage value dropped by the ALC operation.

$$VCMAX=ICMAX \times TINT \qquad \text{Equation 1}$$

A common offset voltage change rate ICMAX may denote a maximum change rate according to time of the common offset voltage VC. Like equation 1, a maximum common voltage VCMAX (not shown) may be obtained by multiplying the common offset voltage change rate ICMAX and the integration time TINT.

$$\tan(\alpha)=VCMAX/TINT \qquad \text{Equation 2}$$

α is an angle at which VC(t) changes, and tan(α) may be obtained by equation 2 depicting a ratio of the maximum common voltage VCMAX to the integration time TINT.

$$\tan(\beta)=VDMAX/TINT \qquad \text{Equation 3}$$

A maximum differential voltage VDMAX may denote a maximum value of the differential voltage VD at the integration time TINT. β denotes an angle at which VC(t) changes, and tan(β) may be obtained by equation 3 depicting a ratio of the maximum differential voltage VDMAX to the integration time TINT.

$$\tan(\beta)=(VMAX-2h)/(TINT-d) \qquad \text{Equation 4}$$

Equation 4 regarding tan(β) may be obtained by using the base and the height of a triangle.

$$h=d \times \tan(\alpha)+d \times \tan(\beta)=VALC \qquad \text{Equation 5}$$

Equation 5 regarding the ALC threshold voltage h may be obtained by addition of a lower portion (d×tan(α)) and an upper portion (d×tan(β)) of a division point DP.

$$d=(VMAX-\tan(\beta) \times TINT)/(2 \times \tan(\alpha)+\tan(\beta)) \qquad \text{Equation 6}$$

Equation 6 may be obtained by combining equation 4 and equation 5, and d may be obtained by equation 6.

$$a=d \times \tan(\alpha) \qquad \text{Equation 7}$$

a may be obtained by using the d, obtained through equation 6, and equation 7.

$$\Delta t=h/\tan(\alpha) \qquad \text{Equation 8}$$

Δt may be obtained by using the ALC threshold voltage h, obtained through equation 5, and equation 8.

$$TN=TINT-d \qquad \text{Equation 9}$$

A second point of time TN may be obtained by using the d, obtained through equation 6, and equation 9.

$$N=[TN/\Delta t] \qquad \text{Equation 10}$$

N depicting a frequency of ALC operations which may be performed during the integration time TINT may be obtained by using the Δt obtained through equation 8, the TN obtained through equation 9, and equation 10. That is, N may be obtained by rounding off decimals from a value calculated by dividing time TN in which an ALC operation is performed N times by Δt, which denotes an interval in which the ALC operation is performed.

FIGS. 24 to 28 are drawings depicting patterns of clock signals supplied to the pixel array illustrated in FIG. 2. Referring to FIGS. 24 to 28, a pixel array 24A to 24E according to an example embodiment of the pixel array 24 illustrated in FIG. 2 may include a plurality of unit pixels 26 each having a two-tap structure.

Figure 24:
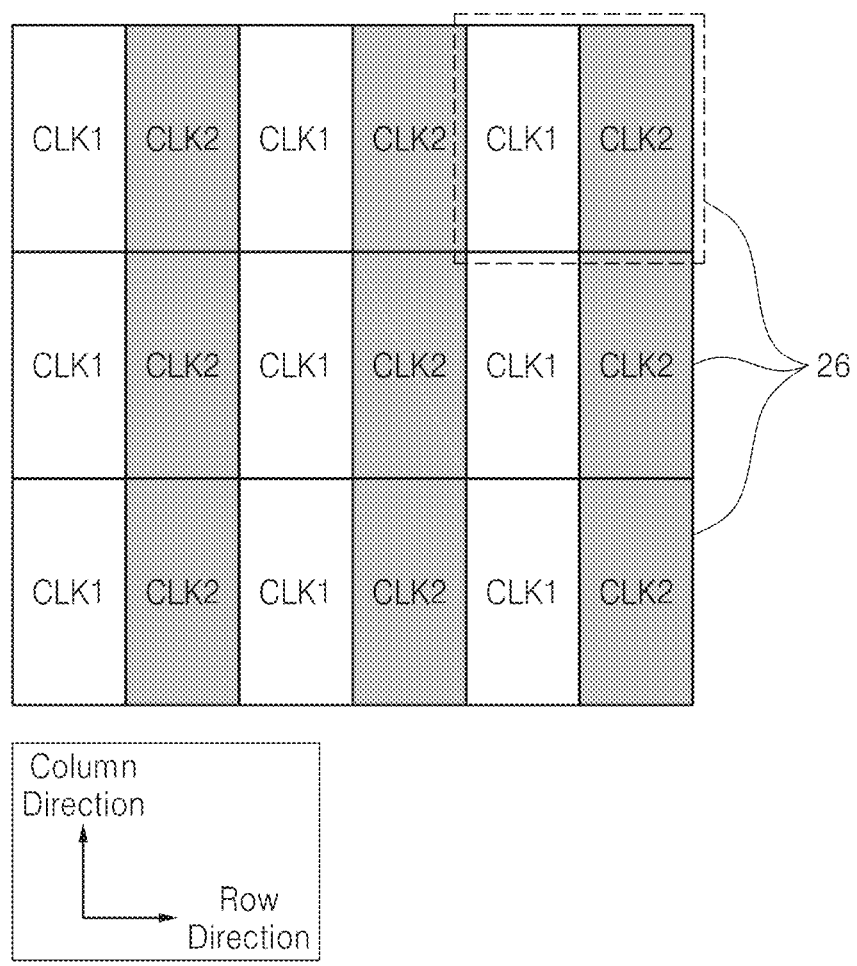
FIGS. 24 to 28 are drawings depicting patterns of clock signals supplied to the pixel array illustrated in FIG. 2.
Figure 25:
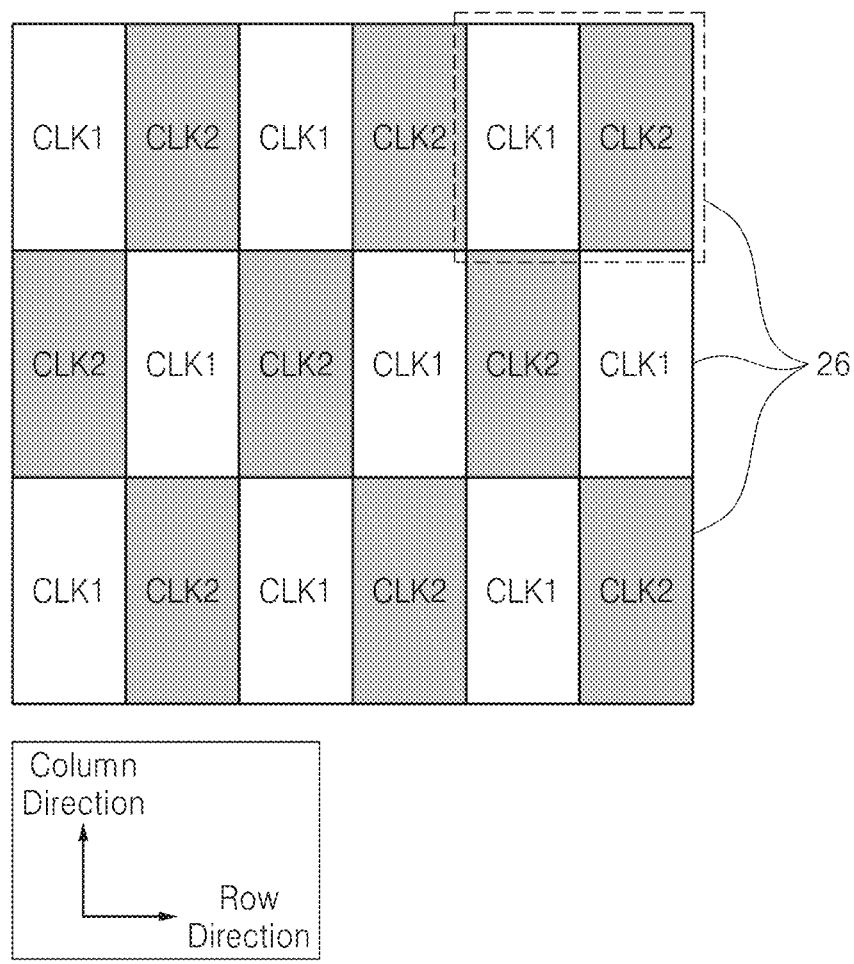

Referring to FIGS. 24 and 25, each of the plurality of unit pixels 26 included in a pixel array 24A or 24B may have a structure in which a magnitude of a column direction is different from a magnitude of a row direction, e.g., a magnitude of the column direction is greater than a magnitude of the row direction. According to an example embodiment, a ratio of the magnitude of the column direction to the magnitude of the row direction may be 2:1.

Referring to FIG. 24, each different clock signal CLK1 or CLK2 may be alternately supplied to each of the sub pixels included in each of the plurality of unit pixels 26 in a row direction. A phase of a clock signal CLK1 and a phase of a clock signal CLK2 may be contrary to each other. That is, a phase difference between the clock signals CLK1 and CLK2 may be 180°.

Referring to FIG. 25, each different clock signal CLK1 or CLK2 may be alternately supplied to each of the sub pixels included in each of the plurality of unit pixels 26 in row and column directions.

Figure 26:
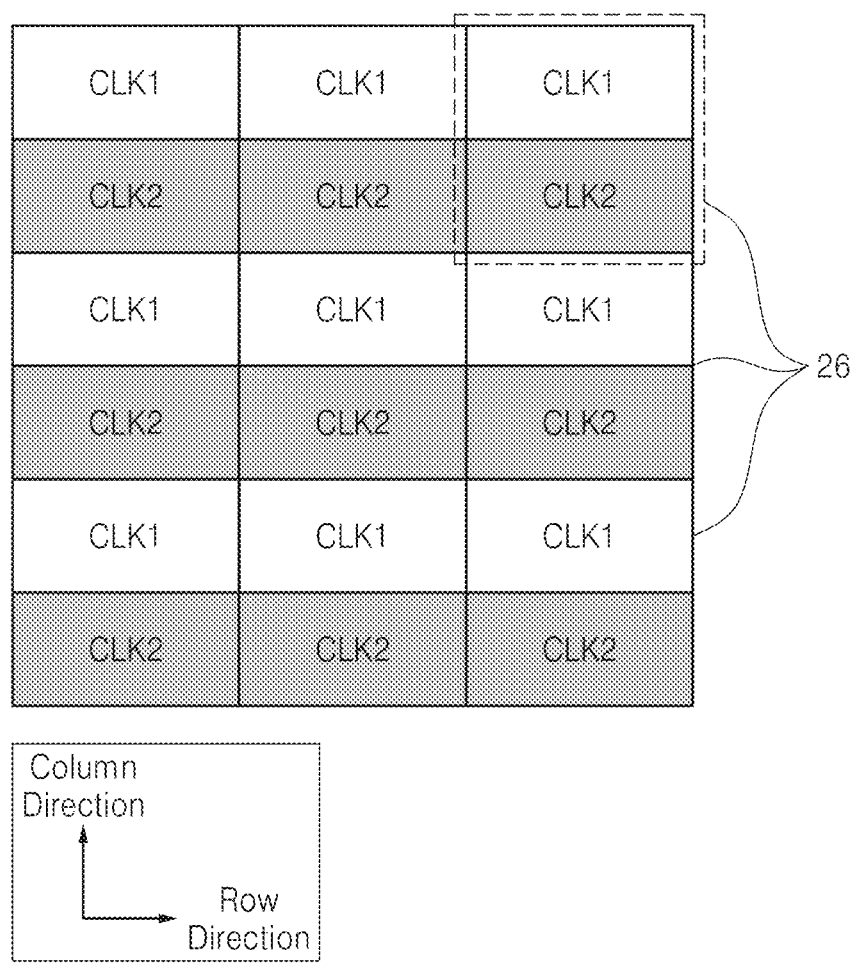
Figure 27:
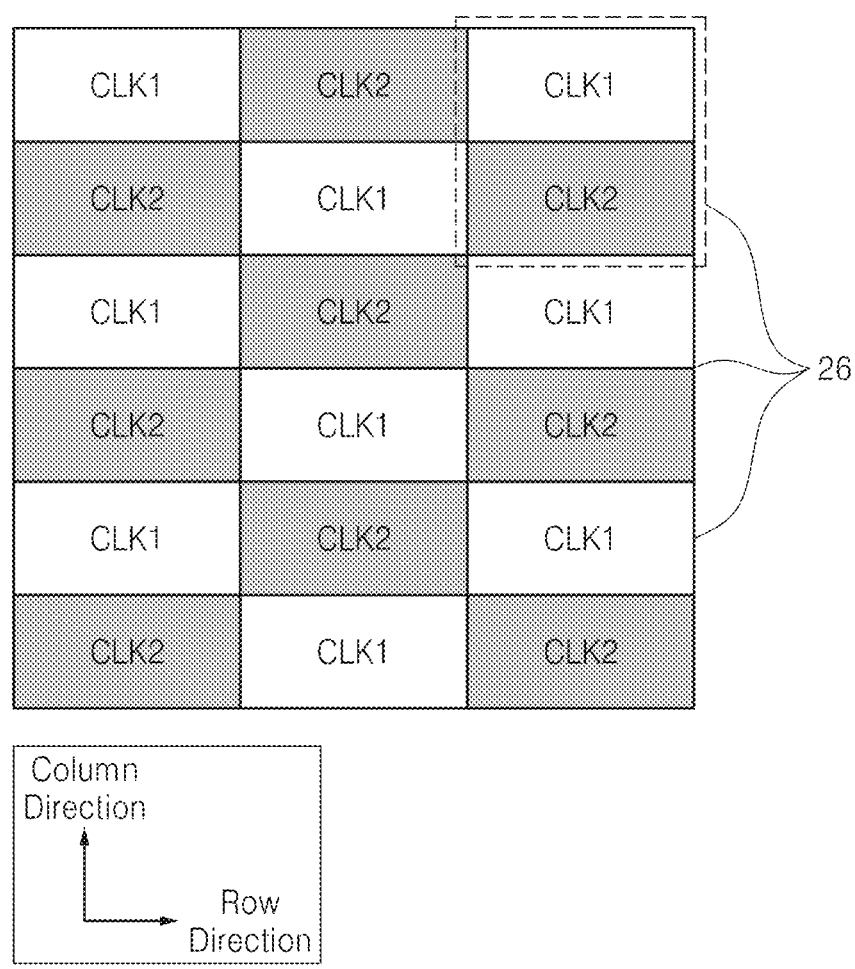

Referring to FIGS. 26 and 27, each of the plurality of unit pixels 26, included in a pixel array 24C or 24D, may have a different structure where a magnitude of a column direction is different from a magnitude of a row direction, e.g., a structure where a magnitude of a column direction is less than a magnitude of a row direction. According to an example embodiment, a ratio of the magnitude of the column direction to the magnitude of the row direction may be 1:2.

Referring to FIG. 26, each different clock signal CLK1 or CLK2 may be alternately supplied to each of the sub pixels included in each of the plurality of unit pixels 26 in column direction. Referring to FIG. 27, each different clock signal CLK1 or CLK2 may be alternately supplied to each of the sub pixels included in each of the plurality of unit pixels 26 in row and column directions.

Figure 28:
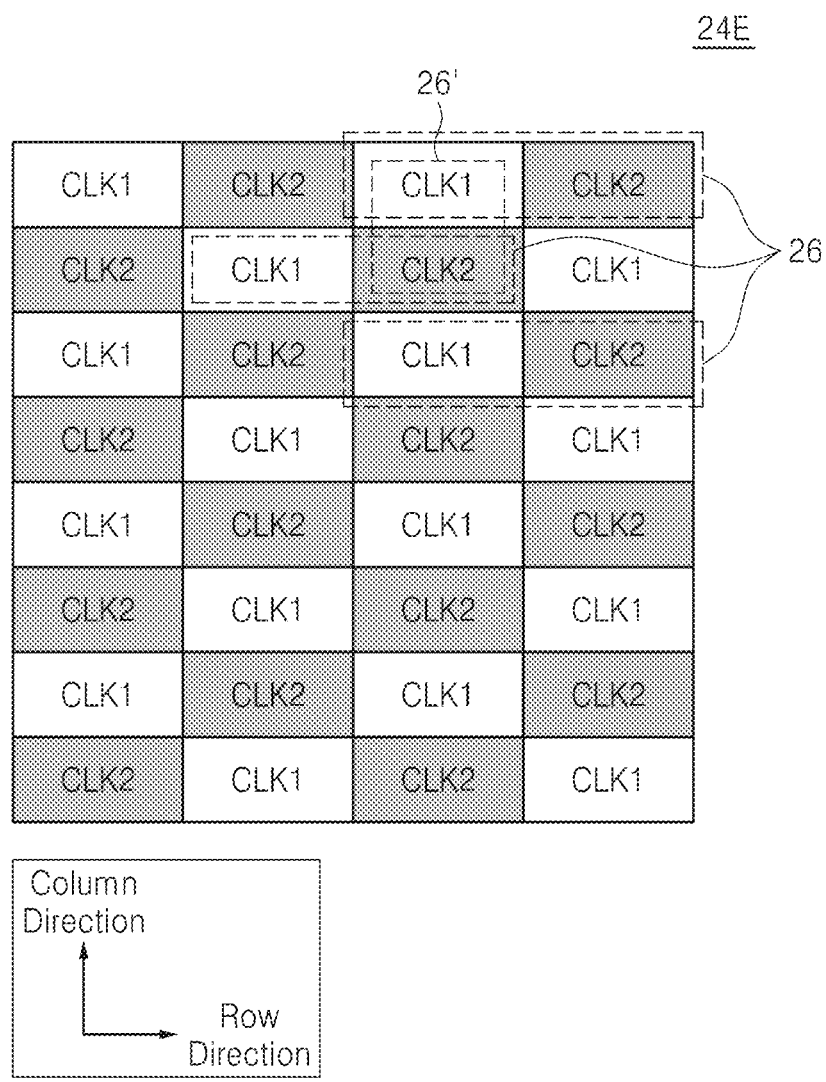

Referring to FIG. 28, each of the plurality of unit pixels 26, included in a pixel array 24E, may have a structure in which a magnitude of a column direction is different from a magnitude of a row direction, e.g., the magnitude of the column direction is less than the magnitude of the row direction. According to an example embodiment, a ratio of the magnitude of the column direction to the magnitude of the row direction may be 1:4.

Each different clock signal CLK1 or CLK2 may be alternately supplied to each of the sub pixels included in each of the plurality of unit pixels 26 in row and column directions.

An ALC unit pixel 26' may be composed of two sub pixels adjacent to each other in a column direction. The sub pixels included in the ALC unit pixel 26' are included in different rows, and each different clock signal CLK1 or CLK2 may be supplied to the sub pixels. The ALC unit pixel 26' may denote a pixel depicting a unit where an ALC operation is performed, and the ALC operation may be performed based on a pixel signal output from each of the sub pixels included in the ALC unit pixel 26'.

According to an example embodiment, each of the plurality of unit pixels 26 included in the pixel array 24E may have a structure in which a magnitude of a column direction is greater than a magnitude of a row direction. For example, a ratio of the column direction to the row direction may be 4:1. In this case, the ALC unit pixel 26' may be composed of two sub pixels adjacent to each other in a row direction. The sub pixels included in the ALC unit pixel 26' may be included in different columns, and the sub pixels may be provided with a different clock signal CLK1 or CLK2.

Figure 29:
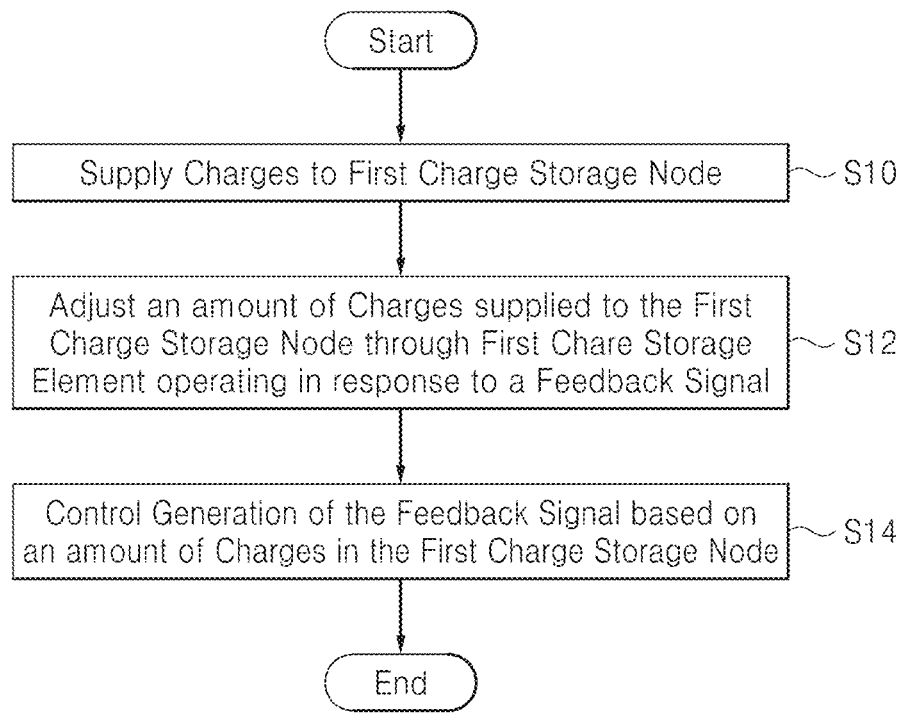
FIG. 29 is a flowchart of a method for operating an image sensor according to an example embodiment of the present inventive concepts.

FIG. 29 is a flowchart of a method for operating an image sensor according to an example embodiment of the present inventive concepts. Referring to FIGS. 9 to 14, and 29, the photoelectric conversion element 40-3 may generate charges, e.g., photo charges, according to light which is incident on the photoelectric conversion element 40-3, and supply the generated charges to the charge storage node CSN3 (S10).

Through a charge storage element MCAP3 operating in response to a feedback signal FBB, an amount of charges, supplied from a charge supply source, e.g., a power line VDD, to a charge storage node CSN3, may be adjusted (S12). The feedback signal generating circuit 38B may control generation of the feedback signal FBB based on a pixel signal PIX3 generated according to an amount of charges in the charge storage node CSN3 (S14).

Figure 30:
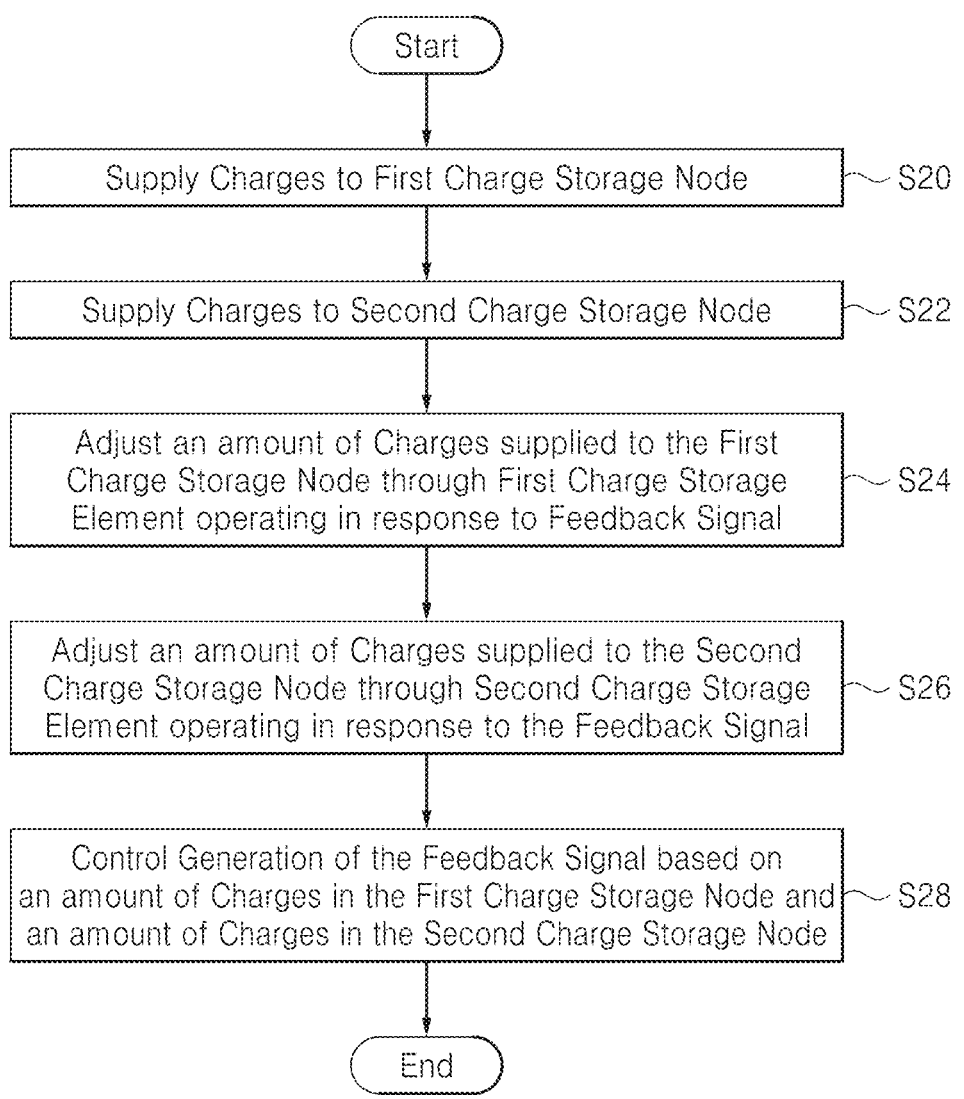
FIG. 30 is a flowchart of a method for operating an image sensor according to another example embodiment of the present inventive concepts.

FIG. 30 is a flowchart of a method for operating the image sensor according to another example embodiment of the present inventive concepts. Referring to FIGS. 3 to 8, 15 to 18, and 30, a photoelectric conversion element 40-1 may generate charges, e.g., photo charges, according to light which is incident on the photoelectric conversion element 40-1, and supply the generated charges to the charge storage node CSN1 (S20).

A photoelectric conversion element 40-2 may generate charges, e.g., photo charges, according to light which is incident on the photoelectric conversion element 40-2, and supply the generated charges to the charge storage node CSN2 (S22).

Through a charge storage element MCAP1 or SMCAP operating in response to the feedback signal FBA or FBB, an amount of charges, supplied from a charge supply source, e.g., a power line VDD, to a charge storage node CSN1, may be adjusted (S24). Through a charge storage element MCAP2 or SMCAP operating in response to the feedback signal FBA or FBB, an amount of charges supplied from the charge supply source, e.g., the power line VDD, to a charge storage node CSN2, may be adjusted (S26).

A feedback signal generating circuit 38A or 38B-3 may control generation of the feedback signal FBA or FBB based on the pixel signals PIX1 or PIX2, generated according to each of the amount of charge in the charge storage node CSN1 and the amount of charges in the charge storage node CSN2.

Figure 31:
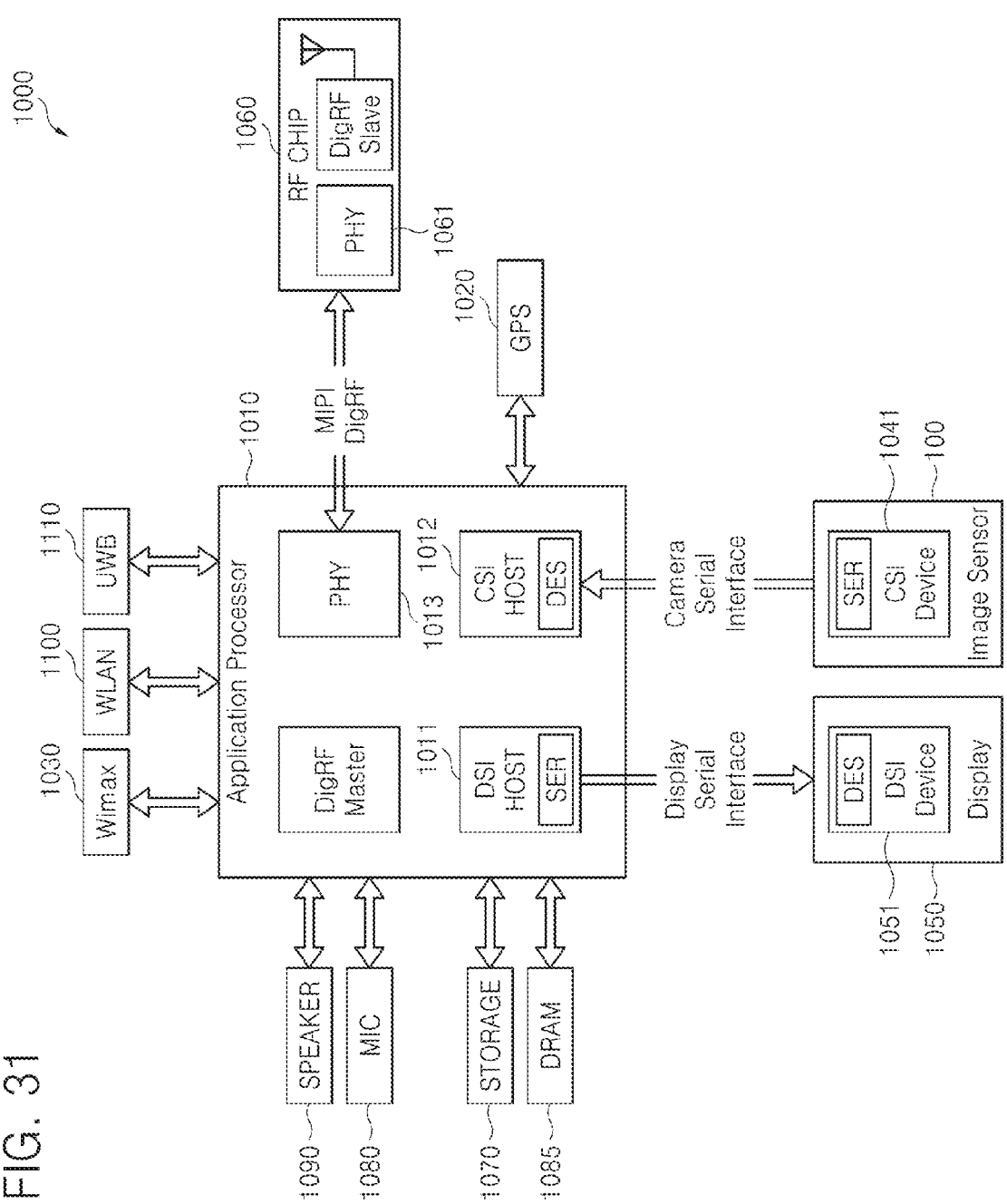
FIG. 31 is a block diagram according to an example embodiment of a system including the image sensor of FIG. 1.

FIG. 31 is a block diagram according to an example embodiment of a system including the image sensor of FIG. 1. Referring to FIGS. 1 and 31, an electronic system 1000 may be embodied in data processing device which may use or support a mobile industry processor interface (MIPI), e.g., a personal digital assistants (PDA), a portable multimedia player (PMP), an internet protocol television (IPTV), or a smart phone.

The electronic system 1000 includes the image sensor 100 of FIG. 1, an application processor 1010, and a display 1050.

A camera serial interface (CSI) host 1012 embodied in the application processor 1010 may perform a serial communication with a CSI device 1041 of the image sensor 100 through a camera serial interface. Here, for example, the CSI host 1012 may include a deserializer (DES), and the CSI device 1041 may include a serializer (SER). A DSI host 1011 embodied in the application processor 1010 may perform a serial communication with a DSI device 1051 of the display 1050 through a display serial interface (DSI). Here, for example, the DSI host 1011 may include a serializer (SER), and the DSI device 1051 may include a deserializer (DES).

According to an example embodiment, the electronic system 1000 may further include a RF chip 1060 which may communicate with the application processor 1010. A PHYsical layer (PHY) 1013 included in the application processor 1010 and a PHY 1061 included in the RF chip 1060 may transmit or receive data each other according to MIPI DigRF. According to an example embodiment, the electronic system 1000 may further include a GPS 1020 receiver, a storage 1070, a microphone (MIC) 1080, a dynamic random access memory (DRAM) 1085, and a speaker 1090.

The electronic system 1000 may communicate using a world interoperability for microwave access (Wimax) module 1030, a wireless lan (WLAN) module 1100, and/or a ultra wideband module 1110.

Figure 32:
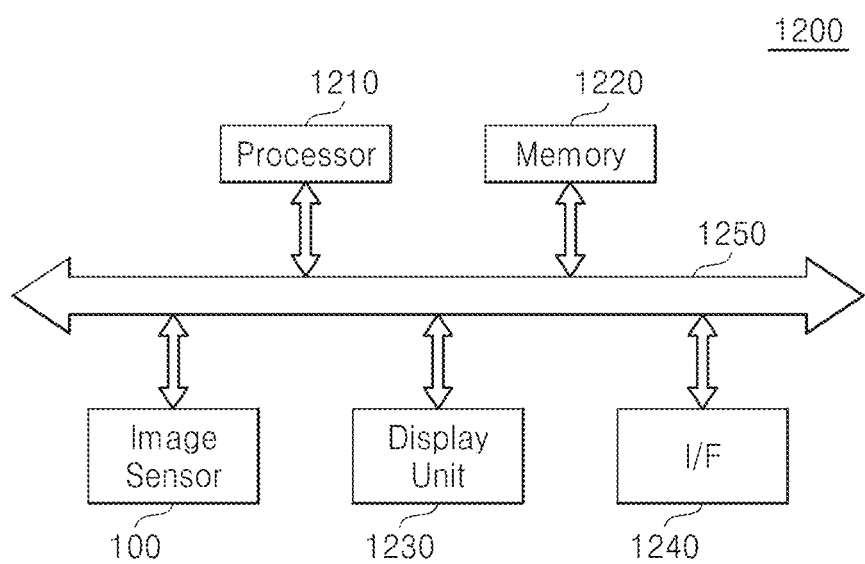
FIG. 32 is a block diagram according to another example embodiment of the system including the image sensor of FIG. 1.

FIG. 32 is a block diagram according to another example embodiment of the system including the image sensor of FIG. 1. Referring to FIGS. 1 and 32, an image processing system 1200 may include the image sensor 100 of FIG. 1, a processor 1210, a memory 1220, a display unit 1230, and an interface 1240.

According to an example embodiment, the image processing system 1200 may be embodied in a medical device or a portable electronic device. The portable electronic device may be embodied in a mobile phone, a smart phone, a tablet PC, a personal digital assistant (PDA), an enterprise digital assistant (EDA), a portable multimedia player (PMP), or an e-book.

The processor 1210 may remove an operation of the image sensor 100, or process image data output from the image sensor 100. According to an example embodiment, the processor 1210 may denote the ISP 200.

The memory 1220 may store a program for controlling an operation of the image sensor 100 and an image generated by the processor 1210 through a bus 1250 according to a control of the processor 1210, and the processor 1210 may execute the program by accessing the stored information. The memory 1220 may be embodied in, for example, a non-volatile memory.

The display unit 1230 may receive an image from the processor or the memory 1220 and display the image through a display, e.g., a Liquid Crystal Display (LCD), a LED display, an OLED display, an Active Matrix Organic Light Emitting Diodes (AMOLED) display, or a flexible display.

An interface 1240 may be embodied in an interface for inputting/outputting two-dimensional or three-dimensional images. According to an example embodiment, the interface 1240 may be embodied in a radio interface.

A method and a device according to an example embodiment of the present inventive concepts may prevent a pixel from being saturated by ambient light by adjusting an amount of charges in a charge storage node, and extend a dynamic range of a pixel. A method and a device according to an example embodiment of the present inventive concepts may reduce different values of noises occurring at the each pixel by adjusting, by pixel, an amount of charges in a charge storage node which is included in each pixel.

A method and a device according to an example embodiment of the present inventive concepts may have an efficient layout by sharing a circuit for an ambient light cancellation (ALC) operation between two sub pixels included in a unit pixel or pixels included in different row lines.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image sensor comprising:
a first photoelectric conversion element configured to supply charges to a first charge storage node;
a first charge storage element configured to adjust an amount of charges supplied from a charge supply source to the first charge storage node in response to a feedback signal;
a feedback signal generating circuit configured to generate the feedback signal based on an amount of charges in the first charge storage node; and
a first switch connected to the charge supply source and a second switch connected to the first charge storage node, wherein the first charge storage element is connected between the first switch and the second switch, and the first switch and the second switch are sequentially turned on in a non-overlapping manner.

2. The image sensor of claim 1, further comprising
a second photoelectric conversion element configured to supply charges to a second charge storage node; and
a second charge storage element configured to adjust an amount of charges supplied from the charge supply source to the second charge storage node in response to the feedback signal,
wherein the feedback signal generating circuit generates the feedback signal based on the amount of charges in the first charge storage node and the amount of charges in the second charge storage node.

3. The image sensor of claim 2, wherein the feedback signal generating circuit includes:
a comparator configured to compare a first pixel signal, related to the amount of charges in the first charge storage node, with a second pixel signal, related to the amount of charges in the second charge storage node, and to generate a comparison signal according to a result of the comparison;
a first selection circuit configured to output the first pixel signal or the second pixel signal based on the comparison signal; and
a second selection circuit configured to output a default voltage signal or an output signal of the first selection circuit as the feedback signal based on a charge supply control signal.

4. The image sensor of claim 2, wherein the charges generated by the first photoelectric conversion element are supplied to the first charge storage node in response to a clock signal, and
the charges generated by the second photoelectric conversion element are supplied to the second charge storage node in response to a complementary clock signal.

5. The image sensor of claim 2, wherein each of the first charge storage element and the second charge storage element is a MOS capacitor.

6. The image sensor of claim 1, wherein the feedback signal generating circuit includes:
a comparator configured to compare a reference signal with a first pixel signal related to the amount of charges in the first charge storage node, and to generate a comparison signal according to a result of the comparison; and
a selection circuit configured to output a default voltage signal or a charge supply control signal as the feedback signal based on the comparison signal.

7. The image sensor of claim 6, further comprising:
a counter configured to count a transition number of a level of the comparison signal; and
a memory configured to store a count value of the counter.

8. An image sensor comprising:
a first photoelectric conversion element configured to supply charges to a first charge storage node;
a first charge storage element configured to adjust an amount of charges supplied from a charge supply source to the first charge storage node in response to a feedback signal;
a second photoelectric conversion element configured to supply charges to a second charge storage node;
a second charge storage element configured to adjust an amount of charges supplied from the charge supply source to the second charge storage node in response to the feedback signal; and
a feedback signal generating circuit configured to generate the feedback signal based on an amount of charges in the first charge storage node,
wherein the feedback signal generating circuit includes:
a first comparator configured to compare a reference signal with a first pixel signal, which is related to the amount of charges in the first charge storage node, and to generate a first comparison signal;
a second comparator configured to compare the reference signal with a second pixel signal, which is related to the amount of charges in the second charge storage node, and to generate a second comparison signal; and
a selection circuit configured to output a default voltage signal or a charge supply control signal as the feedback signal based on the first comparison signal and the second comparison signal.

9. The image sensor of claim 8, wherein the charges, generated by the first photoelectric conversion element, are supplied to the first charge storage node in response to a clock signal, and
the charges, generated by the second photoelectric conversion element, are supplied to the second charge storage node in response to a complementary clock signal.

10. An image sensor comprising:
a first photoelectric conversion element configured to supply charges to a first charge storage node;
a first charge storage element configured to adjust an amount of charges supplied from a charge supply source to the first charge storage node in response to a feedback signal;

a second photoelectric conversion element configured to supply charges to the second charge storage node, wherein the first charge storage element adjusts an amount of charges, supplied from the charge supply source to the first charge storage node, or an amount of charges, supplied from the charge supply source to the second charge storage node.

11. The image sensor of claim 10, further comprising:
a first switch configured to switch supplying of charges from the charge supply source to the first charge storage element;
a second switch configured to switch supplying of the charges stored in the first charge storage element to the first charge storage node;
a third switch configured to switch supplying of the charges stored in the second charge storage element to the second charge storage node.

12. The image sensor of claim 11, wherein each of the second switch and the third switch is turned on at a different timing.

13. The image sensor of claim 11, wherein both the first switch and the second switch are turned on when a reset operation for resetting the first charge storage node is executed.

14. The image sensor of claim 1, further comprising:
a second photoelectric conversion element configured to supply charges to a second charge storage node; and
a second charge storage element configured to adjust an amount of charges, supplied from the charge supply source to the second charge storage node, in response to a second feedback signal,
wherein the first photoelectric conversion element and the second photoelectric conversion element are disposed at different rows, respectively, and
the feedback signal generating circuit transmits the feedback signal, generated based on an amount of charges in the first charge storage node, to the first charge storage node, or transmits the second feedback signal generated based on an amount of charges in the second charge storage node, to the second charge storage node.

15. The image sensor of claim 14, wherein the first charge storage element adjusts an amount of charges, supplied from the charge supply source to the first charge storage node, in response to the feedback signal, or an amount of charges, supplied from the charge supply source to the second charge storage node, in response to the second feedback signal.

16. A method for operating an image sensor comprising:
supplying charges to a first charge storage node;
adjusting an amount of charges, supplied from a charge supply source to the first charge storage node, through a first charge storage element operating in response to a feedback signal;
controlling generation of the feedback signal based on an amount of charges in the first charge storage node; and
controlling a first switch connected to the charge supply source and a second switch connected to the first charge storage node, the first charge storage element connected between the first switch and the second switch,
wherein the first switch and the second switch are controlled to be sequentially turned on in a non-overlapping manner.

17. The method for operating an image sensor of claim 16, further comprising:
supplying charges to a second charge storage node; and adjusting an amount of charges, supplied from the charge supply source to a second charge storage node, through a second charge storage element operating in response to the feedback signal,
wherein the controlling generation of the feedback signal further includes controlling generation of the feedback signal based on the amount of charges in the first charge storage node and the amount of charges in the second charge storage node.

18. The method for operating an image sensor of claim 17, wherein the supplying charges to the first charge storage node and the supplying charges to the second charge storage node are alternately performed by using complementary clock signals.

19. The method for operating an image sensor of claim 17, wherein the controlling generation of the feedback signal includes,
outputting one of a first pixel signal, related to the amount of charges in the first charge storage node, a second pixel signal, related to the amount of charges in the second charge storage node, and a default voltage signal as the feedback signal based on a charge supply control signal.

20. The method for operating an image sensor of claim 17, wherein the controlling generation of the feedback signal includes,
outputting one of a default voltage signal and a charge supply control signal as the feedback signal based on a first pixel signal related to the amount of charges in the first charge storage node controlling generation of the feedback signal.

21. A portable electronic device comprising:
an image sensor;
a processor for controlling the image sensor; and
a display for displaying an image corresponding to an output signal output from the image sensor,
wherein the image sensor includes:
a photoelectric conversion element configured to supply charges to a first charge storage node;
a first charge storage element configured to adjust an amount of charges supplied from a charge supply source to the first charge storage node in response to a feedback signal; a feedback signal generating circuit configured to generate the feedback signal based on an amount of charges in the first charge storage node; and
a first switch connected to the charge supply source and a second switch connected to the first charge storage node,
wherein the first charge storage element is connected between the first switch and the second switch, and the first switch and the second switch are sequentially turned on in a non-overlapping manner.

22. The portable electronic device of claim 21, wherein the image sensor is operative in time of flight (TOF) mode.

23. An image processing system comprising:
an image sensor; and
an image signal processor (ISP) configured to process an image data output from the image sensor,
wherein the image sensor includes:
a first photoelectric conversion element configured to supply charges to a first charge storage node;
a first charge storage element configured to adjust an amount of charges supplied from a charge supply source to the first charge storage node in response to a feedback signal; and
a feedback signal generating circuit configured to generate the feedback signal based on an amount of charges in the first charge storage node; and a first switch connected to the charge supply source and a second switch connected to the first charge storage node, wherein the first charge storage element is connected between the first switch and the second switch, and the first switch and the second switch are sequentially turned on in a non-overlapping manner.

24. The image processing system of claim 23, wherein the image sensor is operative in a time of flight (TOF) mode.

* * * * *